United States Patent
Lee et al.

(10) Patent No.: US 10,796,448 B2
(45) Date of Patent: Oct. 6, 2020

(54) METHODS AND SYSTEMS FOR PLAYER LOCATION DETERMINATION IN GAMEPLAY WITH A MOBILE DEVICE

(71) Applicant: NEX Team Inc., San Jose, CA (US)

(72) Inventors: Keng Fai Lee, Cupertino, CA (US); Man Hon Chan, Hong Kong (HK); Wing Hung Chan, Hong Kong (HK); On Loy Sung, Hong Kong (HK)

(73) Assignee: NEX Team Inc., San Jose, CA (US)

( * ) Notice: Subject to any disclaimer, the term of this patent is extended or adjusted under 35 U.S.C. 154(b) by 0 days.

(21) Appl. No.: 16/669,472

(22) Filed: Oct. 30, 2019

(65) Prior Publication Data
US 2020/0151903 A1 May 14, 2020

Related U.S. Application Data

(60) Provisional application No. 62/758,018, filed on Nov. 9, 2018.

(51) Int. Cl.
*A63B 24/00* (2006.01)
*G06T 7/73* (2017.01)
(Continued)

(52) U.S. Cl.
CPC .......... *G06T 7/73* (2017.01); *G06T 7/50* (2017.01); *G06T 7/62* (2017.01); *G06T 7/80* (2017.01);
(Continued)

(58) Field of Classification Search
CPC ............ A63B 24/0021; A63B 24/0062; A63B 24/0084; A63B 69/0071; A63B 69/38;
(Continued)

(56) References Cited

U.S. PATENT DOCUMENTS 6,307,576 B1  10/2001  Rosenfeld
8,253,797 B1 *  8/2012  Maali ................. G06T 7/73
                                                        345/419
(Continued)

OTHER PUBLICATIONS

Krzysztof Przednowek, et al., "A System for Analysing the Basketball Free Throw Trajectory Based on Particle Swarm Optimization," Applied Sciences, 2018, vol. 8, Issue 11, p. 2090, MDPI, Basel, Switzerland.
(Continued)

*Primary Examiner* — Lawrence S Galka
(74) *Attorney, Agent, or Firm* — American Patent Agency PC; Daniar Hussain; Xiaomeng Shi

(57) ABSTRACT

Methods and systems for detecting a player in a gaming environment using a mobile device are disclosed. The methods and systems perform the steps of receiving calibration data from a camera of a user device, the calibration data comprising a first reference point associated with the gaming environment, a second reference point associated with the gaming environment, and sensor data associated with the user device; computing a camera projection based on the first reference point, the second reference point, and the sensor data obtained from the user device; receiving an input video of the gaming environment, wherein the input video is captured using the camera, and wherein frames of the input video comprise at least one player in the gaming environment; identifying an image location of the player by performing a computer vision algorithm on the input video; and determining a real-world location of the player based on the image location and the camera projection.

20 Claims, 20 Drawing Sheets

(51) Int. Cl.
    *G06T 7/80*          (2017.01)
    *G06T 7/62*          (2017.01)
    *G06T 7/50*          (2017.01)

(52) U.S. Cl.
    CPC ............... *G06T 2207/10016* (2013.01); *G06T 2207/30196* (2013.01); *G06T 2207/30221* (2013.01); *G06T 2207/30244* (2013.01)

(58) Field of Classification Search
    CPC ... A63B 63/083; A63B 71/06; A63B 71/0622; A63B 71/0669; A63B 2220/806; A63B 2243/0037; A63B 2024/0034; A63B 2024/0056; G06T 7/30; G06T 7/80; G06T 2207/10016; G06T 2207/30221; G06T 2207/30224; G06T 2207/30228; G06N 3/0454; A63F 13/812; G09B 19/0038; H04N 21/4223; H04N 21/44008
    See application file for complete search history.

(56) References Cited

U.S. PATENT DOCUMENTS

| | | | | |
|---|---|---|---|---|
| 9,390,501 | B2* | 7/2016 | Marty | A63B 24/0003 |
| 9,886,624 | B1 | 2/2018 | Marty et al. | |
| 10,010,778 | B2 | 7/2018 | Marty et al. | |
| 2005/0143154 | A1 | 6/2005 | Bush | |
| 2015/0055821 | A1* | 2/2015 | Fotland | G06K 9/3241 |
| | | | | 382/103 |
| 2018/0056124 | A1* | 3/2018 | Marty | A63B 24/0021 |
| 2018/0218243 | A1* | 8/2018 | Felsen | G06N 20/00 |
| 2018/0336704 | A1* | 11/2018 | Javan Roshtkhari | G03B 43/00 |
| 2019/0087661 | A1 | 3/2019 | Lee et al. | |
| 2019/0147219 | A1* | 5/2019 | Thornbrue | G06K 9/00208 |
| | | | | 348/169 |

OTHER PUBLICATIONS

Simone Francia, "SpaceJam: a Dataset for Basketball Action Recognition," Github Code Repository Page, available at: https://github.com/simonefrancia/SpaceJam, last access: Apr. 2, 2019.
Techsmith Corporation, "Coach's Eye," Coach's Eye website, available at: https://www.coachseye.com/, last accessed: Feb. 18, 2019.
STATS LLC, "STATS SportVU Basketball Player Tracking," SportVU website, available at: https://www.stats.com/sportvu-basketball/, last accessed: Feb. 12, 2019.
Vignesh Ramanathan, et al., "Detecting events and key actors in multi-person videos," The IEEE Conference on Computer Vision and Pattern Recognition (CVPR), 2016, pp. 3043-3053.
Mark Sandler, et al., "MobileNetV2: Inverted Residuals and Linear Bottlenecks," The IEEE Conference on Computer Vision and Pattern Recognition (CVPR), 2018, pp. 4510-4520, available at: https://arxiv.org/abs/1801.04381, last accessed: May 7, 2019.
Wei Liu, et al., "SSD: Single Shot MultiBox Detector," European conference on computer vision, pp. 21-37, Springer, Cham, 2016, available at: https://arxiv.org/abs/1512.02325, last accessed: May 7, 2019.
Zhe Cao, et al., "Realtime Multi-Person 2D Pose Estimation using Part Affinity Fields," Proceedings of the IEEE Conference on Computer Vision and Pattern Recognition, pp. 7291-7299, 2017, available at: https://arxiv.org/abs/1611.08050, last accessed: May 7, 2019.
Andrew G. Howard, et al., "MobileNets: Efficient Convolutional Neural Networks for Mobile Vision Applications," arXiv preprint arXiv:1704.04861, 2017, available at: https://arxiv.org/abs/1704.04861, last accessed: May 7, 2019.
Raine Kajastila, et al., "Motion Games in Real Sports Environments," XXII.2 Mar. + Apr. 2015, Available at: https://interactions.acm.org/archive/view/march-april-2015/motion-games-in-real-sports-environments, last accessed May 21, 2019.
Raine Kajastila, et al., "Empowering the Exercise: a Body-Controlled Trampoline Training Game," International Journal of Computer Science in Sport—vol. 13/2014/Edition 1, Available at: www.iacss.org.
Raine Kajastila, et al., "Augmented Climbing: Interacting With Projected Graphics on a Climbing Wall," CHI 2014, Apr. 26-May 1, 2014, Toronto, ON, Canada, ACM 978-1-4503-2474-8/14/04. Available at: http://dx.doi.org/10.1145/2559206.2581139, last accessed May 22, 2019.
Perttu Hamalainen, Tommi Llmonen, et al., "Martial Arts in Artificial Reality," CHI 2005 Papers: Enhancing Virtual Spaces and Large Displays, Apr. 2-7, Portland Oregon, US.
Rainer Planinc, et al., "Exergame Design Guidelines for Enhancing Elderly's Physical and Social Activities," Ambient 2013 : The Third International Conference on Ambient Computing, Applications, Services and Technologies, Available at: https://pdfs.semanticscholar.org/80d7/ddb6d443ef693fd59e12b5413a2a142ef6da.pdf.
Kazumoto Tanaka et al., "A Comparison of Exergaming Interfaces for Use in Rehabilitation Programs and Research," The Journal of the Canadian Game Studies Association, vol. 6(9): 69-81, 2012, Available at: http://loading.gamestudies.ca.
Andy Butler, et al.,"Nike 'House of Mamba' LED Basketball Court by AKQA", Aug. 16, 2014, Available at: https://www.designboom.com/design/nike-house-of-mamba-led-basketball-court-08-16-2014/, last accessed Jun. 18, 2019.

\* cited by examiner

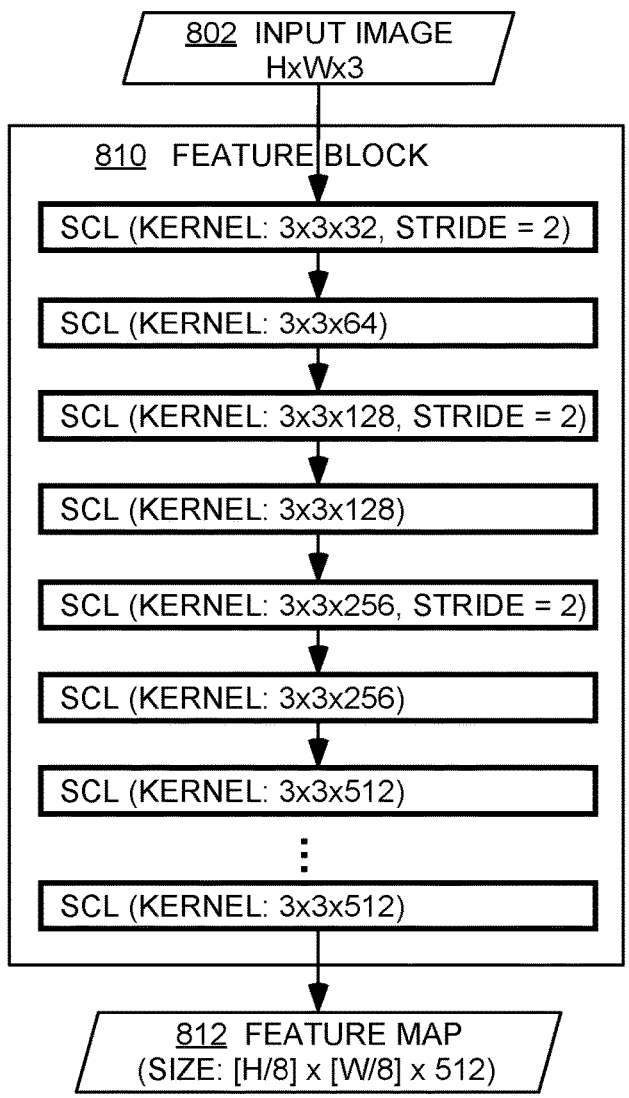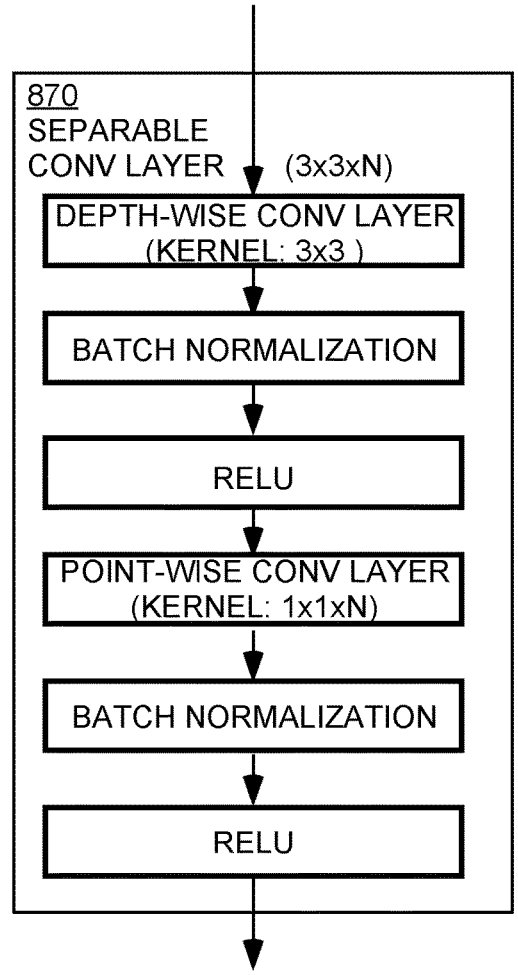
FIG. 8B                    FIG. 8C

METHODS AND SYSTEMS FOR PLAYER LOCATION DETERMINATION IN GAMEPLAY WITH A MOBILE DEVICE

REFERENCE TO RELATED APPLICATIONS

This application is a non-provisional of and claims priority to provisional U.S. Ser. No. 62/758,018, filed on 9 Nov. 2018, entitled "*METHODS AND SYSTEMS FOR PLAYER LOCATION DETERMINATION IN GAMEPLAY WITH A MOBILE DEVICE*", the entire disclosure of which is hereby incorporated by reference in its entirety herein.

This application is related to non-provisional U.S. Ser. No. 16/109,923, filed on 23 Aug. 2018, entitled "*Methods and Systems for Ball Game Analytics with a Mobile Device*", the entire disclosure of which is hereby incorporated by reference in its entirety herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of sports and games, and pertain particularly to methods and systems for enabling player location determination in gameplay with a mobile device, the mobile device having one or more cameras for video capture.

BACKGROUND OF THE INVENTION

The statements in this section may serve as a background to help understand the invention and its application and uses, but may not constitute prior art.

Modern computing technology has brought in a new era of rapid real-time analysis of sports activities. Whether it's a viewer watching a game for leisure, a coach analyzing plays to adapt to the opposing team's strategy, or a general manager compiling data sets across multiple games to optimize player retention strategies, real-time analysis enables thorough quantitative game analytics by granting the viewer instantaneous access to statistical data of every single play. Sport analytics have seen uses in applications such as broadcasting, game strategizing, and team management, yet real-time analytics systems for mass mainstream usage are still complex and expensive. Real-time tracking technology based on image recognition often requires use of multiple high-definition cameras mounted on top of a game area or play field for capturing visual data from multiple camera arrays positioned at multiple perspectives, calibration for different environments, and massive processing power in high-end desktop and/or server-grade hardware to analyze the data from the camera arrays. Accurate tracking of key events throughout the game, such as identifying key players involved in point or shot attempts, identifying locations of such attempts, and recognizing the results of such attempts, requires vast resources, including expensive equipment with complicated setups that prevent mass adaptation of both real-time and off-line sports analytics systems.

In particular, determining a real-world player location in a real-world gaming environment from video data of the gaming environment is an important bottleneck for many sports analytics applications. If player location determination can be implemented with low-cost, general-purpose hardware having a small form factor, such a mobile device, a multitude of player analytics becomes possible.

Therefore, it would be an advancement in the state of the art to allow player location identification using just a mobile device by utilizing video data captured from a camera on the mobile device. In common situations where the end user places the mobile device and its camera at, or close to, the ground level, it is difficult or impossible to see the ground itself, which makes player location identification especially challenging from the video data. It would therefore be another significant advancement in the state of the art to allow accurate player location identification using a mobile device even when the ground is difficult or impossible to see in the video data.

It is against this background that various embodiments of the present invention were developed.

BRIEF SUMMARY OF THE INVENTION

In order to solve the aforementioned problems with video data lacking a clear view of the ground due to the mobile device being placed at, or close to, the ground ("ground mode"), the present invention was developed. Embodiments of the present invention include methods, systems, and devices for enabling player location determination in a gaming environment using a mobile device having a camera. In particular, in one embodiment, a method is disclosed that includes the steps of receiving calibration data from a camera of a user device, the calibration data comprising a first reference point associated with the gaming environment, a second reference point associated with the gaming environment, and sensor data associated with the user device; computing a camera projection based on the first reference point, the second reference point, and the sensor data obtained from the user device; receiving an input video of the gaming environment, wherein the input video is captured using the camera, and wherein frames of the input video comprise at least one player in the gaming environment; identifying an image location of the player by performing a computer vision algorithm on the input video; and determining a real-world location of the player based on the image location and the camera projection.

In some embodiments, the user device is positioned on a ground level or substantially proximate to the ground level.

In some embodiments, the calibration data is generated by calibrating the camera by providing instructions to position the player at a predetermined location in the gaming environment corresponding to the first reference point.

In some embodiments, the first reference point comprises a first feature location of the gaming environment, and the first reference point is determined based at least in part on a determination of a body part of the player located at the first feature location.

In some embodiments, the determination of the body part of the player further comprises a determination of a dimension of the body part of the player. In some embodiments, the dimension of the body part of the player is utilized in the determining of the real-world location of the player. In some embodiments, the dimension of the body part of the player is utilized in verifying a consistency of the calibration data.

In some embodiments, the second reference point comprises a second feature location of the gaming environment different from the first feature location of the gaming environment.

In some embodiments, the camera projection is a camera projection matrix computed from a first reference point correspondence between the first reference point at a first real-world location and at a first image location, and a second reference point correspondence between the second reference point at a second real-world location and at a second image location.

In some embodiments, the sensor data comprises a camera intrinsic matrix of the camera. In some embodiments, the sensor data comprises an accelerator data from the user device. In some embodiments, the sensor data comprises the camera intrinsic matrix and the accelerometer data.

In some embodiments, the gaming environment is basketball. In some embodiments, the first reference point is the player's location at a known ground location (such as, but not limited to, the "free throw" line). In some embodiments, the second reference point is a hoop at a known hoop location.

In some embodiments, the method further includes estimating a camera height comprising a distance between the user device and a ground level, the camera height estimated from the input video. In some embodiments, a foot location of the player at a first feature location is utilized for the first reference point when the camera height exceeds a given threshold. In some embodiments, a head location of the player at a first feature location is utilized for the first reference point when the camera height is below a given threshold. In some embodiments, the camera height is utilized in the computing of the camera projection.

In another aspect, one embodiment of the present invention is a system for detecting a player in a gaming environment, comprising at least one processor and a non-transitory physical medium for storing program code accessible by the at least one processor, the program code when executed by the processor causes the processor to perform the aforementioned steps.

In another aspect, one embodiment of the present invention is a non-transitory physical medium for detecting a player in a gaming environment, the storage medium comprising program code stored thereon, and the program code when executed by a processor causes the processor to perform the aforementioned steps.

In yet another aspect, one embodiment of the present invention is a mobile device having a camera, a hardware processor, and a non-transitory storage medium, the non-transitory storage medium storing executable instructions, the executable instructions when executed by the hardware processor cause the hardware processor to execute a process comprising the aforementioned steps.

Yet other aspects of the present invention include methods, processes, and algorithms comprising the steps described herein, and also include the processes and modes of operation of the systems and servers described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 8B is a detailed block diagram illustrating an exemplary Feature Block used in FIG. 8A, according to exemplary embodiments of the present invention.

FIG. 8C is a detailed block diagram illustrating an exemplary separable convolutional neural network (CNN) layer used in FIG. 8A, according to exemplary embodiments of the present invention.

DETAILED DESCRIPTION OF THE INVENTION

Figure 1A:
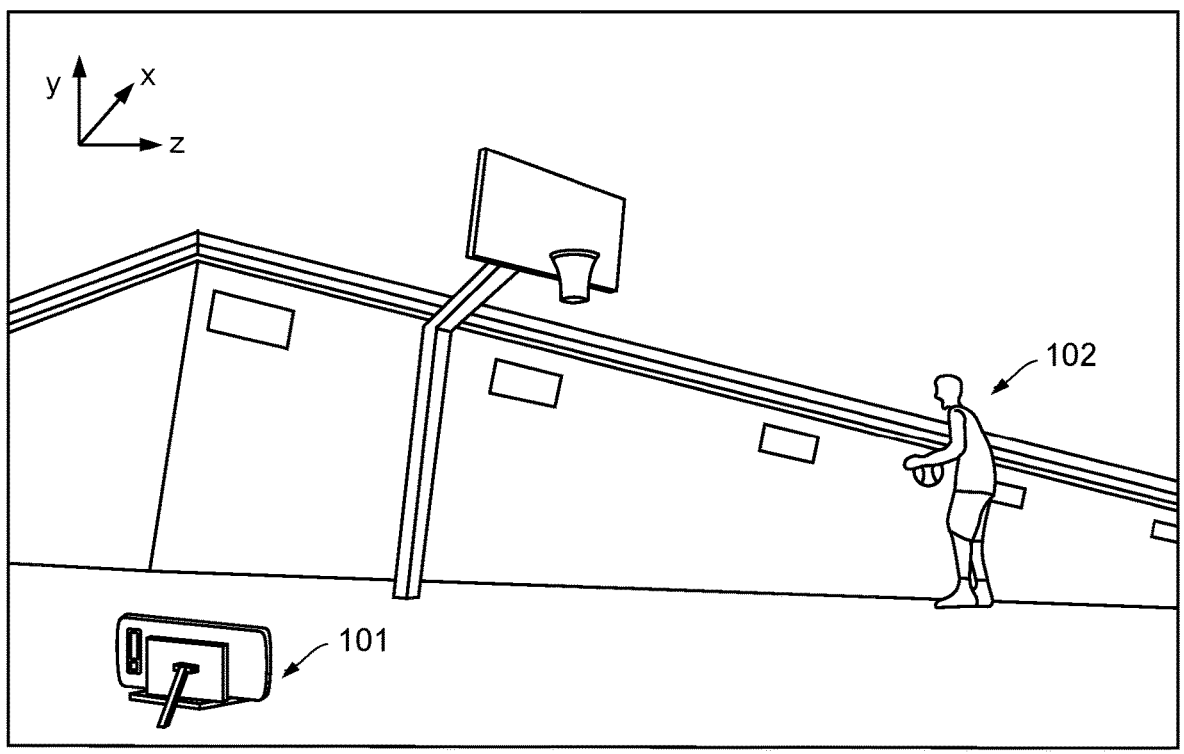
FIG. 1A is an exemplary setup for tracking a player location in a gaming environment using a mobile computing device, when the mobile computing device is at or near ground level, according to some embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game video capturing and analytics generation platform, as well as the company providing said platform. With reference to the figures, embodiments of the present invention are now described in detail.

Exemplary Embodiment for Player Location Determination in Ground Mode

Overview

Broadly, embodiments of the present invention relate to enabling the tracking of player locations in sports games, and pertain particularly to methods and systems for enabling player location determination in a gaming environment with a mobile device, the mobile device having one or more cameras for video capture. It would be understood by persons of ordinary skill in the art that the terms "game," "game play," and "gaming environment" in this disclosure refer to not only competitive activities involving opposing teams, but also individual and group practice or drilling activities. In other words, embodiments of the present invention may be used for determining the locations of players in physical activities, as long as there is at least one player present on at least one game area being recorded. For example, embodiments of the present invention may be applied to basketball, soccer, baseball, football, hockey, running, dance, and many other types of sports, physical activities, or other games in a similar fashion.

More specifically, embodiments of the present invention relate to providing player data and feedback (e.g., audio, visual, and/or text feedback) to one or more users that play a real-world physical game (e.g., sports, such as basketball, soccer, etc.) through the use of one or more computer vision algorithms running on a mobile device (e.g., a smartphone, tablet, laptop, smart glasses, etc.). In various embodiments, the physical games are not necessarily rooted in the virtual world and as such, do not require a user to interact with the screen (or other systems) of the mobile device to conduct all or most aspects of the gameplay. Rather, the mobile device allows the user to conduct gameplay in the real-world (e.g., play a game of basketball, soccer, etc.), while the mobile device determines player locations and automatically tracks player statistics, scores, shot attempts, and so forth.

As noted, the game can include a traditional physical game that can be played in the real world (e.g., not in the virtual world), for example, on a court, field, trail, and the like. Moreover, in some embodiments, the game can offer a level of interactivity with one or more users linked through electronic devices such as mobile devices (e.g., smart phones) using a network connection (e.g., WiFi, cellular, and the like). In one embodiment, the electronic device may be used in a tripod-mounted or handheld fashion to monitor, report, and facilitate real-world physical gameplay through the use of the electronic device's camera coupled with one or more artificial-intelligence (AI)-based computer vision algorithms. Embodiments of the present invention can be used in different game areas (e.g., different basketball courts, soccer fields, etc.), indoor or outdoor settings, and under varying lighting conditions. Further, the algorithms may support the placement of the mobile device in a variety of locations (e.g., to capture different angles), and the algorithms may be robust against vibration or minor accidental movements of the mobile device.

Moreover, unlike conventional computer vision-based real-time sports analysis systems that require several high-resolution cameras mounted on top of a gaming area (e.g., a basketball court) and the use of high-end desktop or server hardware, embodiments of the present invention allow users to determine locations of players in a game (e.g., a game of basketball) with a mobile device by utilizing simple on-device cameras. The present invention addresses the inherent limitations associated with mobile devices as well as the placement of the mobile device on the ground level. Firstly, the limited computational resources in a mobile device itself presents a unique challenge. For instance, a smartphone's limited CPU processing power is heat-sensitive. A CPU clock rate may also be reduced by the operating system (OS) whenever the phone heats up. Secondly, when a system consumes too much memory, the system or application running on the mobile device may be terminated by the OS. Thirdly, the amount of battery that the analytics system consumes is controlled, otherwise the limited battery on a smartphone may not last a required duration (e.g., duration of a whole game). In the case of a mobile device placed in an outdoor or even indoor location, an external power source may not be readily available, and the mobile device has to run entirely on its own battery power.

Ground Mode

In one circumstance common in practice where a tripod or other mounting device is not available to the user, the electronic device may be placed at or near the ground level ("ground mode"), without the utilization of a tripod or other mounting device. The electronic device (e.g., mobile phone) may be mounted or placed on the ground out of convenience to the user as no special mounting hardware is required. In some embodiments, the mobile device may simply be placed on the ground level (e.g., concrete floor, basketball court, etc.). Some embodiments of the present disclosure are directed to accurate player location determination in environments in which the electronic device has been placed at or near the ground level. The mobility and flexibility in placing a mobile device on the ground enables capturing a view of the players and the gameplay from various angles and distances.

The mobile device may be positioned on, at, near, or substantially on the ground ("ground mode"), as shown illustratively in FIG. 1A. In FIG. 1A, a mobile device 101 is placed on the ground level in gaming environment 100 comprising at least one player 102. Also shown in FIG. 1A is the real-world coordinate system (x,y,z) in the upper-left hand corner corresponding to real-world locations, such as the player's real-world location (x,y,z).

Figure 1B:
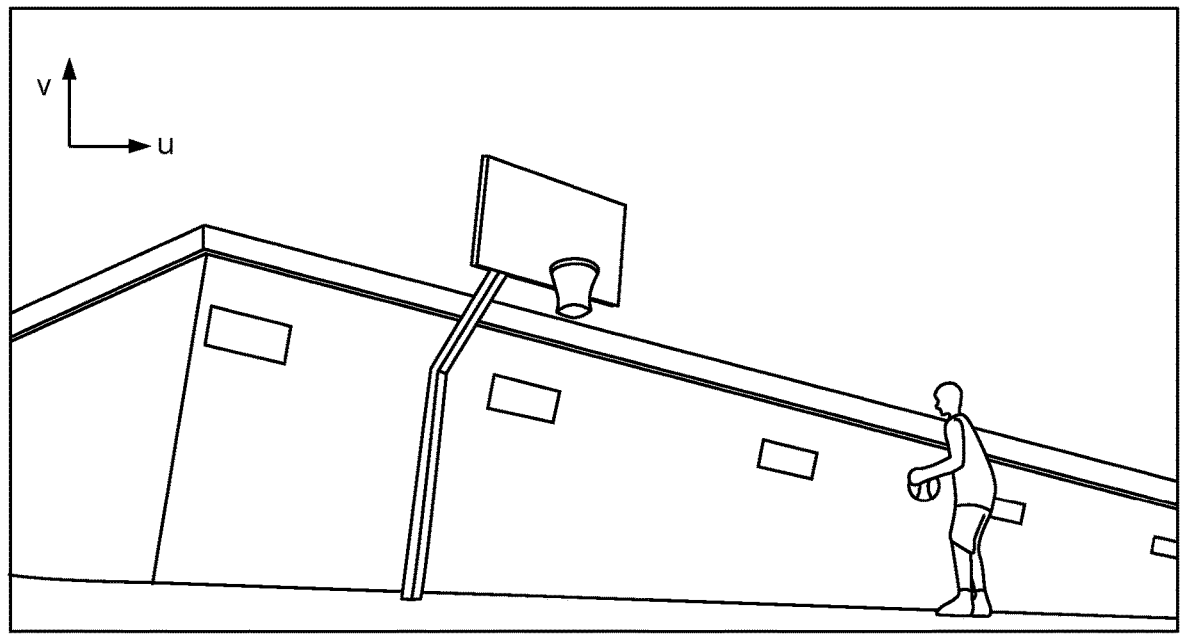
FIG. 1B shows an example gaming environment where the user device is positioned at or near the ground and at an angle that hampers ground visibility, in accordance with example embodiments of the disclosure.
Figure 1C:
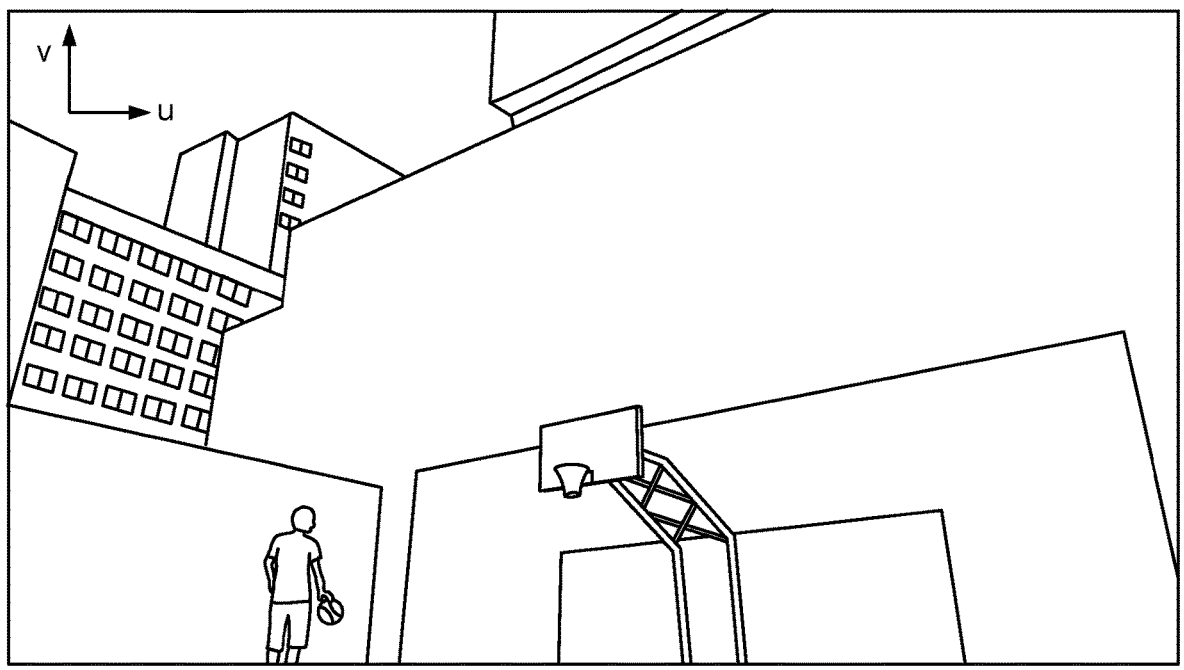
FIG. 1C shows another example gaming environment where the user device is positioned at or near the ground and at an angle that totally obstructs ground visibility and player foot locations, in accordance with example embodiments of the disclosure.

However, in the case of the mobile device being positioned on, at, near, or substantially on the ground, the visibility of the ground from the mobile device's camera may be relatively low. In some circumstances when the mobile device is placed on the ground, the ground may have very low visibility under some camera rotation angles for a user device positioned on the ground, or might not even be visible at all. For example, FIG. 1B shows a gaming environment where the user device is positioned on or near the ground and at an angle that hampers ground visibility, particularly on the far end of diagram. In another example, FIG. 1C shows a gaming environment where the user device is positioned on or near the ground and at an angle such that the ground (and correspondingly the player's foot location) is entirely not visible. Also shown in FIGS. 1B and 1C is the image coordinate system (u,v) in the upper-left hand corner corresponding to image locations, such as the player's image location (u,v) in the frames of the video.

Moreover, when the mobile device 101 is placed on the ground, since the visibility of the ground far from the camera may be low, a relatively small measurement error (e.g., a few pixels of measurement error) in the image coordinates may lead to a computed distance error on the order of meters in the real-world coordinates. In various aspects, if the user device is determined to be positioned on the ground, embodiments of the present invention may use this determination to reduce the effects of these measurement errors. Further, information from a player-in-scene calibration procedure (described below) can also facilitate detection of the player's real-world ground location in subsequent video streams even though the ground (and player's feet location) is of low or no visibility, provided that a camera projection (as described below) associated with the camera of the user device remains valid.

Broadly, various embodiments of the disclosure are directed to a calibration procedure that may be used for a player-in-scene calibration in a gaming environment. In particular, embodiments of the disclosure may be used to generate a first reference point (e.g., a marking in a gaming environment, such as a "free throw" line) that may enhance the scene detection performed by the user device. In another aspect, the first reference point may be used with a second reference point (e.g., another, existing point in the gaming environment, such as a hoop in the case of a basketball game). Accordingly, by using the two reference points and a given user device's sensor data (e.g., camera intrinsic matrix, accelerometer measurements, etc.), a camera projection (e.g., camera projection matrix P) can be computed. Thereafter, the user device may be configured to predict a real-world location (x,y,z) of a player from the player's image location (u,v) in a given video stream while a given camera projection associated with the calibration remains valid (e.g., while the camera projection matrix P does not require recalculation resulting from a movement of the user device).

Figure 1D:
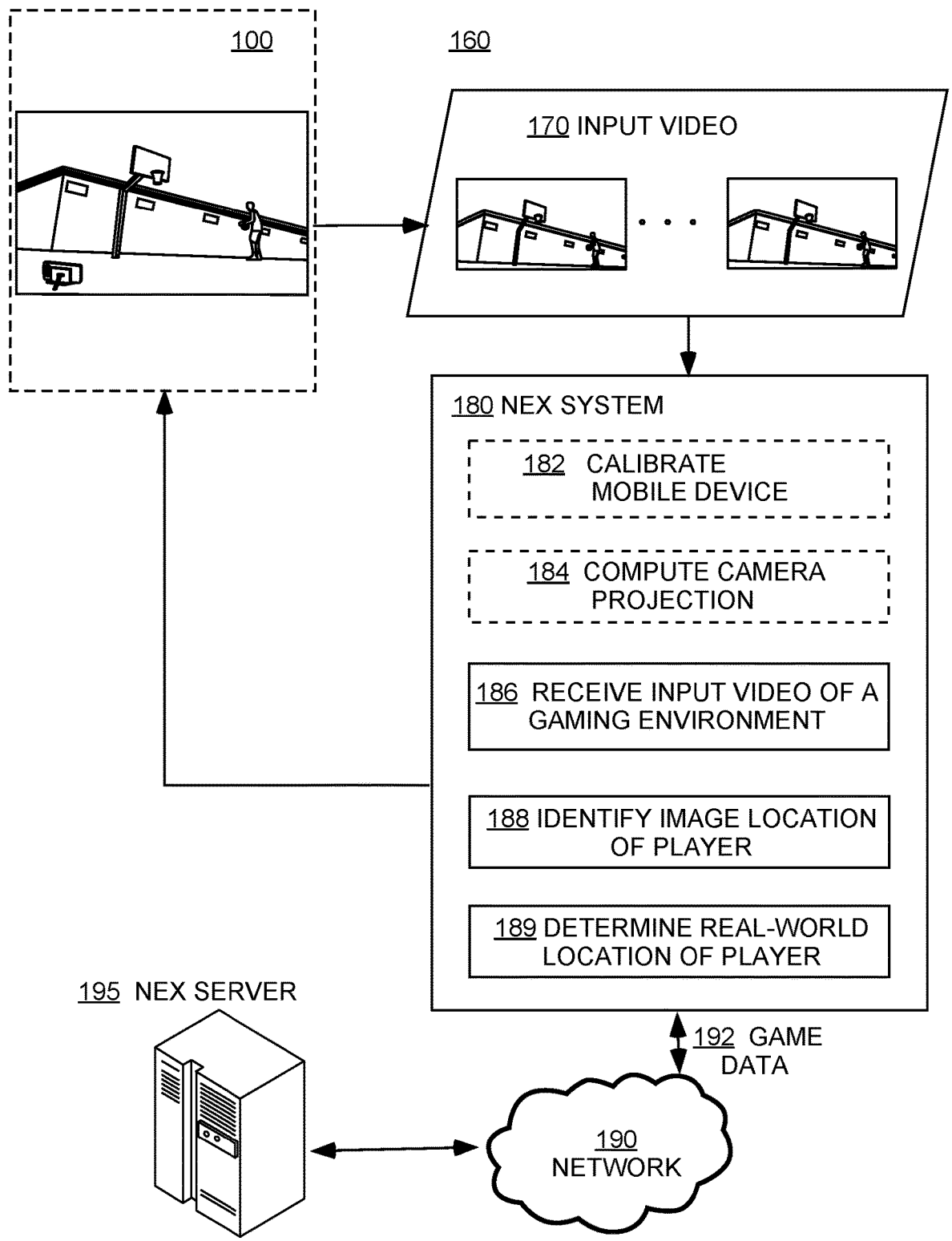
FIG. 1D is an architectural overview of a mobile computing device-based system for player location tracking, according to some embodiments of the present invention.

As an illustrative embodiment, FIG. 1D shows an architectural overview 160 of a system for player location tracking, according to some embodiments of the present invention. A NEX system 180 may be implemented on a mobile computing device (such as mobile device 101) to capture player actions and ball motions in a gaming environment 100 such as a ball court. An input video 170 thus captured by the mobile computing device 101 is analyzed by NEX system 180 using one or more computer vision algorithms, which may also be implemented on the mobile computing device 101. Player motion, movement, or posture, ball trajectories, as well as basket and court line positions may be determined. In some embodiments, input video 170 may be a live video stream captured in real-time.

More specifically, as it is being captured and streamed by NEX system 180, input video 170 may be used at step 182 to first calibrate the mobile computing device 101 using calibration data, the calibration data comprising a first reference point and a second reference point associated with the gaming environment 100, and sensor data associated with the camera of the mobile device 101, as described in detail below. Next, at step 184, the system computes a camera projection (e.g., camera projection matrix) based on the first reference point, the second reference point, and the sensor data obtained from the user device 101, as described in greater detail below. Next, at step 186, the system receives an input video 170 of the gaming environment 100, where the input video 170 is captured using the camera of the mobile device 101, and where frames of the input video 170 comprise at least one player 102 in the gaming environment 100. Next, at step 188, the system identifies an image location of the player 102 by performing a computer vision algorithm on the input video 170, for example, using "pose" estimation described below. Finally, at step 189, the system determines a real-world location of the player 102 in the gaming environment 100 based on the image location and the camera projection.

Once calibration is completed, input video 170 may be continuously analyzed via steps 186, 188, and 189 in real-time, or near real-time, as it is captured, without recalibrating the mobile device or recomputing the camera projection, while a given camera projection associated with the calibration remains valid (e.g., while the camera projection matrix does not require recalculation resulting from a movement of the mobile device).

In some embodiments, game data 192 from one or more other players or other game sessions, including historical sessions by the same players, may be downloaded from a NEX server 195 via a network 190. Game data 192 may include game video recordings, and player and game analytics. While not shown explicitly here, the NEX server 195 may comprise one or more databases for storing game videos and analytics, and one or more processors for generating live or historical game statistics for participating users. Exemplary implementations for the NEX server 195 are provided with reference to FIG. 3.

The image location of the player 102 may be identified by performing a computer vision algorithm on the input video 170, for example, using "pose" estimation. In the field of computer vision, "pose" or "posture" estimation is the task of identifying or detecting the position and orientation of an object in an image, relative to some coordinate system. This is generally formulated as the process of determining key point locations that describe the object. In the case of a ball, pose estimation may refer to determining the center and radius of the ball in the image plane. Human pose estimation is the process of detecting major parts and joints of the body, such as head, torso, shoulder, ankle, knee, and wrist. In this disclosure, "player posture" and "player pose" are used interchangeably to refer to either or both of the image of a human player segmented from the input video, and a set of key points extracted from the image to represent body pose or posture. In addition, instead of only determining whether an object such as a ball or a player is present in a given video frame, object detection or extraction in the present disclosure refers to determining the relative position, size, and/or pose of a ball, player, or other entities of interest. In some embodiments, the object detection process is applied on a skip frame basis, for example at regular intervals to downsample the input video stream before processing to reduce computation load, or to possibly bypass desired portions of the input video stream such as when the players are known to be dribbling instead of making shot attempts.

To detect objects of interests such as court lines, balls and players from frames of the input video, one or more convolutional neural networks (CNN) may be applied. Each CNN module may be trained using one or more prior input videos. A CNN utilizes the process of convolution to capture the spatial and temporal dependencies in an image, and to extract features from the input video for object detection. The term "feature" here is not limited to visual or color schemes of objects to be detected; the term "feature" also covers many other object characteristics, including shapes, sizes, curvatures, textures, boundaries, and the like. Feature extraction in turn enables segmentation or identification of image areas representing these objects, such as balls and players, and further analysis to determine player body postures. For example, a ball moves through space, leading to changing size and location from video frame to video frame. A player also moves through space while handling the ball, leading to both changing locations, sizes, and body postures.

Once objects are detected or extracted from individual frames and classified into respective clusters, object flows may be established by grouping detected objects within the same cluster along a time line. Object movements across frames are continuous in the sense that object locations can only change in small increments from one video frame to the next. In some embodiments, a flow refers to object instances from different frames. All object instances in the same flow may be considered the same object. In other words, for a ball or posture in a flow, all instances of the ball or posture in all frames of the video are identified as the same object. Thus, in this disclosure, detected player postures may be assigned based on color information to existing player posture flows.

Next, various details of the system implementation are described in relation to FIGS. 2-9B, before returning to a discussion of the ground mode operation in relation to FIGS. 10-18.

Implementation Using Computer Program Products, Methods, and Computing Entities

Exemplary System Architecture

Figure 2:
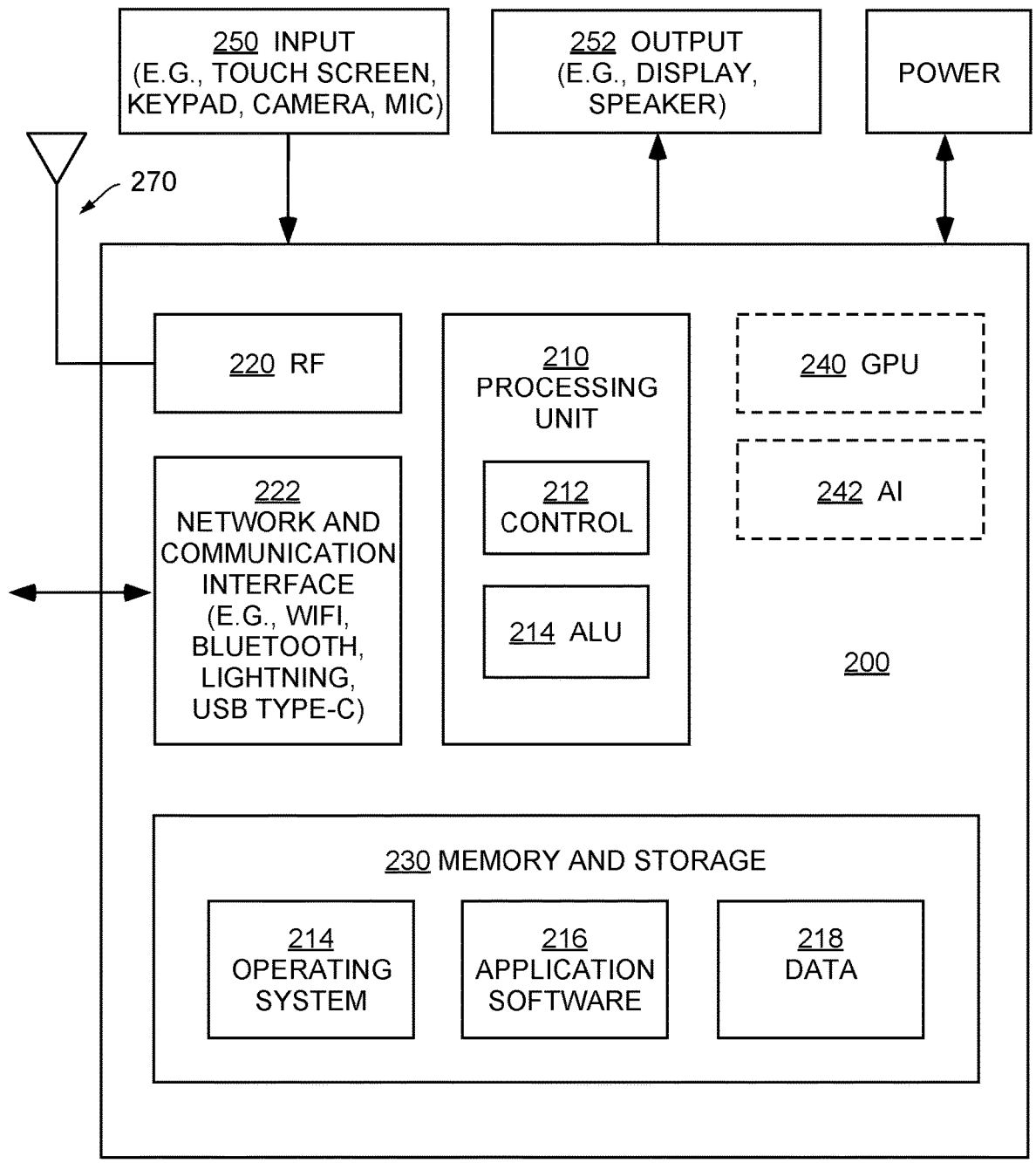
FIG. 2 is an exemplary schematic diagram of a user computing entity for implementing player location tracking, according to exemplary embodiments of the present invention.
Figure 3:
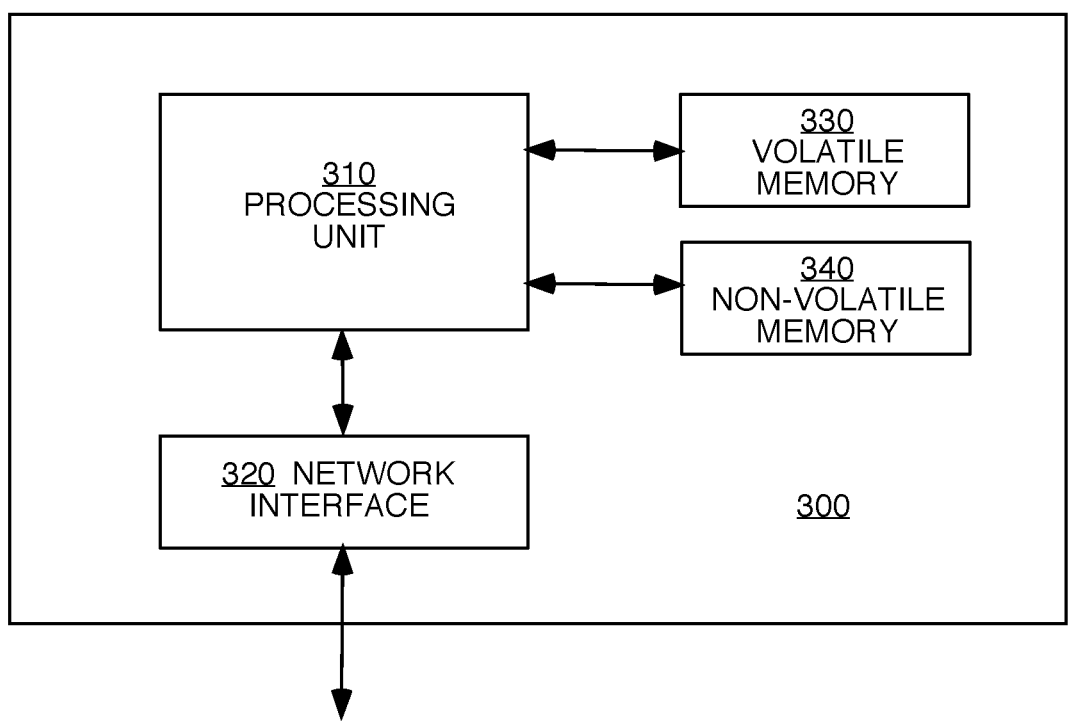
FIG. 3 is an exemplary schematic diagram of a management computing entity for implementing a player location tracking system, according to exemplary embodiments of the present invention.

An exemplary embodiment of the present disclosure may include one or more user computing entities 200, one or more networks 190, and one or more server or management computing entities 300, as shown in FIGS. 2 and 3. Each of these components, entities, devices, systems, and similar words used herein interchangeably may be in direct or indirect communication with, for example, one another over the same or different wired or wireless networks. Additionally, while FIGS. 2 and 3 illustrate the various system entities as separate, standalone entities, the various embodiments are not limited to this particular architecture.

Exemplary User Computing Entity

FIG. 2 is an exemplary schematic diagram of a user computing device for implementing a multiplayer ball game tracking system, according to exemplary embodiments of the present invention. A user operates a user computing device 200 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 200 may be a mobile device, and may be operated by a user participating in a multiplayer ball game. On the other hand, a server 195 may be implemented according to the exemplary schematic diagram shown in FIG. 3, possibly in the cloud, and possibly with logically or physically distributed architectures.

As shown in FIG. 2, the user computing entity 200 may include an antenna 270, a radio transceiver 220, and a processing unit 210 that provides signals to and receives signals from the transceiver. The signals provided to and received from the transceiver may include signaling information in accordance with air interface standards of applicable wireless systems. In this regard, the user computing entity 200 may be capable of operating with one or more air interface standards, communication protocols, modulation types, and access types. More particularly, the user computing entity 200 may operate in accordance with any of a number of wireless communication standards and protocols. In some embodiments, user computing entity 200 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, the user computing entity 200 may operate in accordance with multiple wired communication standards and protocols, via a network and communication interface 222.

Via these communication standards and protocols, the user computing entity 200 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 200 can also download changes, add-ons, and updates, for instance, to its firmware, software (e.g., including executable instructions, applications, program modules), and operating system.

In some implementations, processing unit 210 may be embodied in several different ways. For example, processing unit 210 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 210 may be configured for a particular use or configured to execute instructions stored in volatile or non-volatile media or otherwise accessible to the processing unit. As such, whether configured by hardware or computer program products, or by a combination thereof, processing unit 210 may be capable of performing steps or operations according to embodiments of the present invention when configured accordingly.

In some embodiments, processing unit 210 may comprise a control unit 212 and a dedicated arithmetic logic unit 214 (ALU) to perform arithmetic and logic operations. In some embodiments, user computing entity 200 may optionally comprise a graphics processing unit 240 (GPU) for specialized image and video rendering tasks, and/or an artificial intelligence (AI) accelerator 242, specialized for applications including artificial neural networks, machine vision, and machine learning. In some embodiments, processing unit 210 may be coupled with GPU 240 and/or AI accelerator 242 to distribute and coordinate processing tasks.

In some embodiments, user computing entity 200 may include a user interface, comprising an input interface 250 and an output interface 252, each coupled to processing unit 210. User input interface 250 may comprise any of a number of devices or interfaces allowing the user computing entity 200 to receive data, such as a keypad (hard or soft), a touch display, a mic for voice/speech, and a camera for motion or posture interfaces. User output interface 252 may comprise any of a number of devices or interfaces allowing user computing entity 200 to provide information to a user, such as through the touch display, or a speaker for audio outputs. In some embodiments, output interface 252 may connect user computing entity 200 to an external loudspeaker or projector, for audio or visual output.

User computing entity 200 may also include volatile and/or non-volatile storage or memory 230, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 214, application software 216, data 218, databases, database instances, database management systems, programs, program modules, scripts, source code, object code, byte code, compiled code, interpreted code, machine code, executable instructions, and/or the like to implement the functions of user computing entity 200. As indicated, this may include a user application that is resident on the entity or accessible through a browser or other user interface for communicating with a management computing entity and/or various other computing entities.

In some embodiments, user computing entity 200 may include location determining aspects, devices, modules, functionalities, and/or similar words used herein interchangeably. For example, user computing entity 200 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 200 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In a multiplayer ball game tracking session, a user computing entity 200 may be deployed (e.g., installed; configured; accepted; installed and accepted; configured and accepted; installed, configured, and accepted; or the like) in a gaming area that includes players and/or game equipment. In some embodiments, at least one input device on user computing entity 200 may collect or may be configured to collect information (e.g., data, metadata, and/or signaling) indicative of operational features of the gaming area and/or equipment for analysis by processing unit 210. For example, computer vision algorithms as implemented on user computer entity 200 may be configured to detect the location of court lines, field boundaries, one or more balls, or goal posts in an input video as captured by an input camera device.

In some embodiments, a system for multiplayer ball game tracking may include at least one user computing device such as a mobile computing device and optionally a mounting apparatus for the at least one mobile computing device. The mounting apparatus may be a tripod or a kickstand, and may mount the electronic device with a camera of the user computing device positioned to monitor a gaming area. In some embodiments, the user computing device may be hand-held or put on the ground leaning against certain articles such as a water bottle. In some embodiments, the system for multiplayer ball game tracking further comprises a sound device, for example, earbuds (e.g., wireless earbuds) or a speaker system (e.g., a public address (PA) system) coupled to the at least one user computing device. The sound device may serve to provide instruction and feedback regarding the game session to the user. In some embodiments, the system optionally comprises an optical device such as a projector, a projection lamp, a laser pointing system, a jumbotron, a television screen, or the like, that can facilitate a multiplayer ball game tracking session. For example, a laser pointing system may point to a location in the gaming area to direct the user to position himself or herself for easier system calibration, initialization, and setup.

In some embodiments, user computing entity 200 may communicate to external devices like other smartphones and/or access points to receive information such as software or firmware, or to send information (e.g., training data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. At least two of the users may be in geographically different gaming areas. In some embodiments, the user computing devices may use a network interface such as 222 to communicate with various other computing entities, such as by communicating data, content, information, and/or similar terms used herein interchangeably that can be transmitted, received, operated on, processed, displayed, stored, and/or the like.

In some embodiments, data such as training statistics, scores, and videos may be uploaded by one or more user computing devices to a server such as shown in FIG. 3 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate a multiplayer ball game tracking session. In some embodiments, audio may be used to (i) direct users to particular positions in gaming areas (with further audio feedback to help the users locate themselves more accurately), (ii) inform users about a motion or action that a user needs to do as part of a setup process or as part of a game (e.g., stand at the center of the free-throw line or shoot from the three-point line), (iii) provide feedback to the user (e.g., to inform them of a shot analytics such as a shot angle), or (iv) report on the progress of the game (e.g., statistics, leaderboard, and the like). In some embodiments, speech recognition and corresponding responses (e.g., audio, visual, textual, etc. responses) may also be used to facilitate the game tracking session by allowing users to set options, or start or stop the tracking session.

In some embodiments, artificial intelligence-based computer vision algorithms may be used to perform at least one of the following: (i) ensure that users are located within a region of interest, (ii) determine when/if users successfully complete a shot attempt, (iii) determine the quality of users' motion/action during the shot attempt, and (iv) award quality points or other attributes depending on the nature of the users' motion during the shot attempt (e.g., determining whether a user scored by dunking or by performing a layup).

To provide for or aid in the numerous determinations (e.g., determine, ascertain, infer, calculate, predict, prognose, estimate, derive, forecast, detect, compute) of training settings, player postures and player analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, training instructions and feedbacks to player may be generated from one or more player analytics derived from user training actions. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 3 is an exemplary schematic diagram of a management computing entity 300, such as NEX server 195, for implementing a multiplayer ball game tracking system, according to exemplary embodiments of the present invention. The terms computing entity, computer, entity, device, system, and/or similar words used herein interchangeably are explained in detailed with reference to user computing entity 200.

As indicated, in one embodiment, management computing entity 300 may include one or more network or communications interface 320 for communicating with various computing entities, such as by communicating data, content, information, and/or similar terms used herein interchangeably that can be transmitted, received, operated on, processed, displayed, stored, and/or the like. For instance, management computing entity 300 may communicate with user computing device 200 and/or a variety of other computing entities. Network or communications interface 320 may utilized a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 300 may be configured to communicate via wireless external communication networks using any of a variety of standards and protocols as discussed with reference to user computing device 200.

As shown in FIG. 3, in one embodiment, management computing entity 300 may include or be in communication with one or more processing unit 310 (also referred to as processors, processing circuitry, processing element, and/or similar terms used herein interchangeably) that communicate with other elements within the management computing entity 300. As will be understood, processing unit 310 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 310 may be configured for a particular use or configured to execute instructions stored in volatile or non-volatile media 330 and 340. As such, whether configured by hardware or computer program products, or by a combination thereof, processing unit 310 may be capable of performing steps or operations according to embodiments of the present disclosure when configured accordingly.

Although not shown explicitly, management computing entity 300 may include or be in communication with one or more input elements, such as a keyboard, a mouse, a touch screen/display, a camera for motion and movement input, a mic for audio input, a joystick, and/or the like. Management computing entity 300 may also include or be in communication with one or more output elements such as speaker, screen/display, and/or the like.

In various embodiments, one or more of the components of management computing entity 300 may be located remotely from other management computing entity components, such as in a distributed system or in the cloud. Furthermore, one or more of the components may be combined and additional components performing functions described herein may be included in the management computing entity 300.

Machine Vision and Machine Learning Modules

As described herein, embodiments of the present invention use one or more artificial intelligence, machine vision, and machine learning algorithms or modules for analyzing game videos and facilitating real-time game tracking. Various exemplary machine vision algorithms are within the scope of the present invention used for performing object recognition, gesture recognition, pose estimation, and so forth. The following description describes in detail some illustrative machine vision and machine learning algorithms for implementing some embodiments of the present invention.

Illustrative Machine Vision Architectures

Some exemplary machine vision algorithms utilize a deep learning network (DLN), for example a convolutional neural network (CNN). Neural networks are computer systems inspired by the human brain. They can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks utilize the process of convolution to reduce the number of model parameters involved, while successfully capturing the spatial and temporal dependencies in an image.

Figure 4:
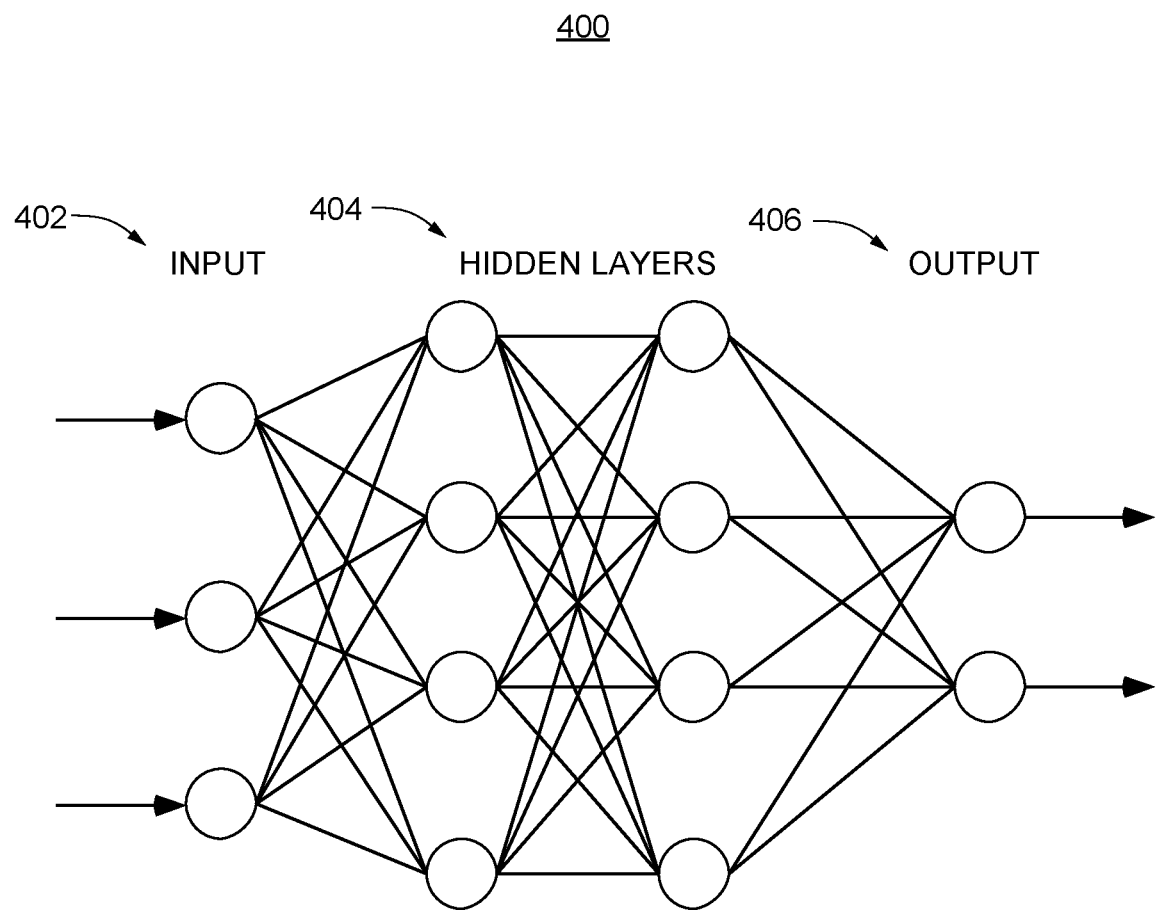
FIG. 4 shows an illustrative block diagram of a convolutional neural network (CNN) for image analysis for enabling player location tracking, according to exemplary embodiments of the present invention.

More specifically, FIG. 4 shows an illustrative block diagram 400 of a convolutional neural network (CNN) for image analysis and object recognition, according to exemplary embodiments of the present invention. This exemplary CNN module 400 may be utilized for implementing various machine vision algorithms described herein. For example, it may be designed and trained to determine gestures and poses and other machine vision tasks required by the present invention, as would be recognized by one of ordinary skill in the art. An input layer 402 is connected via a multiplicity of hidden layers 404 to an output layer 406. Input layer 402 is a map for pixels of an input image. Exemplary hidden layers may include, but are not limited to, convolutional layers, Rectified Linear Units (ReLU), pooling layers, normalization layers, and fully connected layers. A convolutional layer applies a convolution or correlation operation by a kernel matrix to the input data to generate a feature map of the input image. ReLU is a non-linear activation function. Pooling layers reduce the dimensionality of the data to decrease the required computational power. A fully connected layer has full connections to all activations in the previous layer, and is needed before classification or output activation at output layer 406. Successive convolution-ReLU-pooling stages allow the successive extraction of low-level to high-level features, from edges, general shapes such as line and circles, to specific shapes representing specific objects. FIG. 8A to 8E provide exemplary block diagrams of a detailed neural network design for pose estimation.

FIG. 4 shows only one illustrative CNN architecture that is within the scope of the present invention, but the present invention is not limited to the use of CNNs. Other machine vision algorithms are also within the scope of the present invention.

Illustrative Machine Learning Architectures

Figure 5:
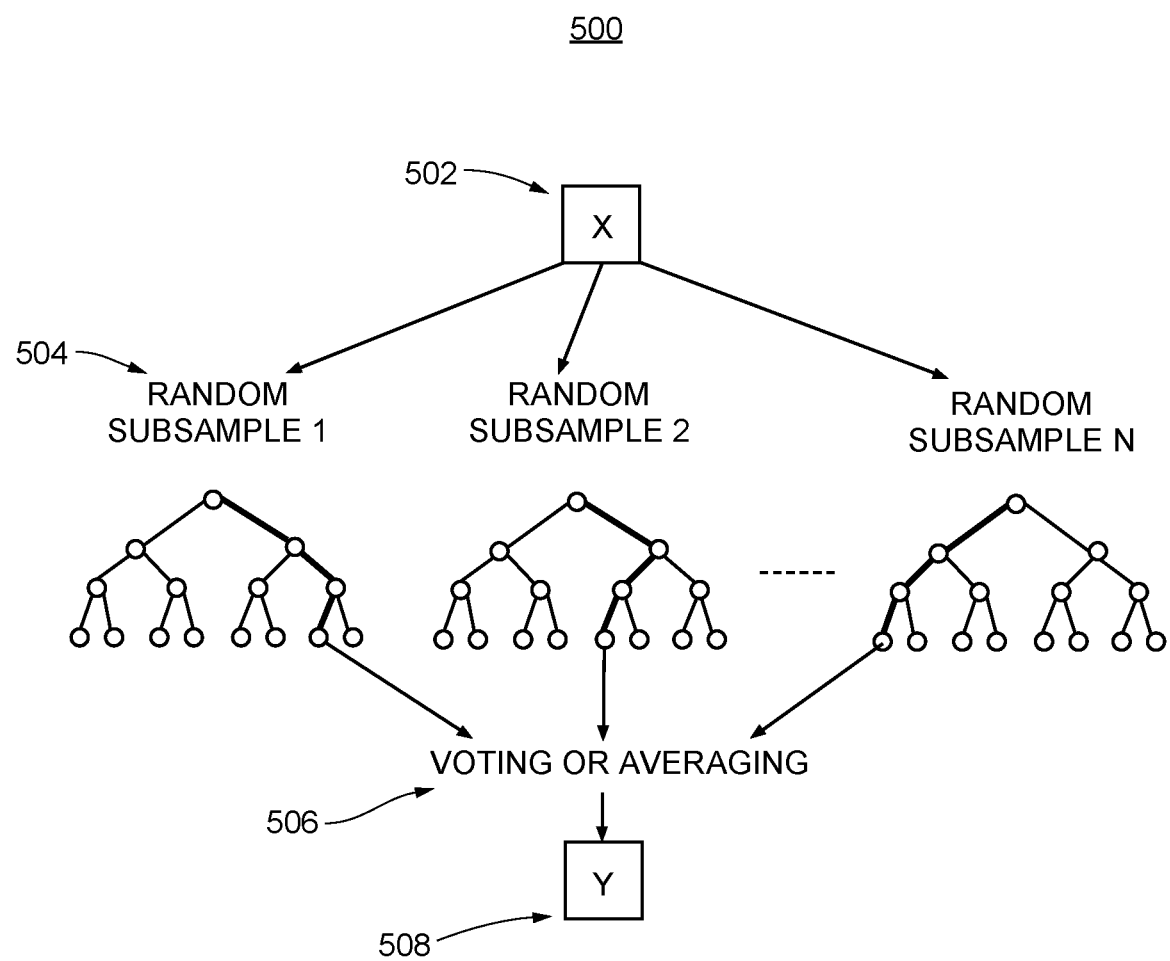
FIG. 5 shows an illustrative block diagram for a machine learning algorithm useful in some embodiments, according to exemplary embodiments of the present invention.

As states herein, various exemplary machine vision and machine learning algorithms are within the scope of the present invention for performing object recognition, gesture recognition, pose estimation, and so forth. FIG. 5 shows an illustrative block diagram 500 for a machine learning algorithm, according to exemplary embodiments of the present invention.

In particular, a supervised machine learning algorithm is shown, comprising an illustrative random forest algorithm. Random forest algorithms are a method for classification and regression. By using a multitude of decision tree predictors 504, each depending on the values of a random subset of a training data set 502, the chances of overfitting to the training data set may be minimized. The decision tree predictors are voted or averaged at a decision step 506 to obtain predictions 508 of the random forest algorithm. For the task of object recognition, input 502 to the machine learning algorithm may include feature values, while output 508 may include predicted gestures and/or poses associated with a user. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

In short, embodiments of devices, systems, and their various components described herein may employ artificial intelligence (AI) to facilitate automating one or more functions described herein, including object recognition, gesture recognition, and pose estimation.

Training Machine Learning Algorithms

Figure 6:
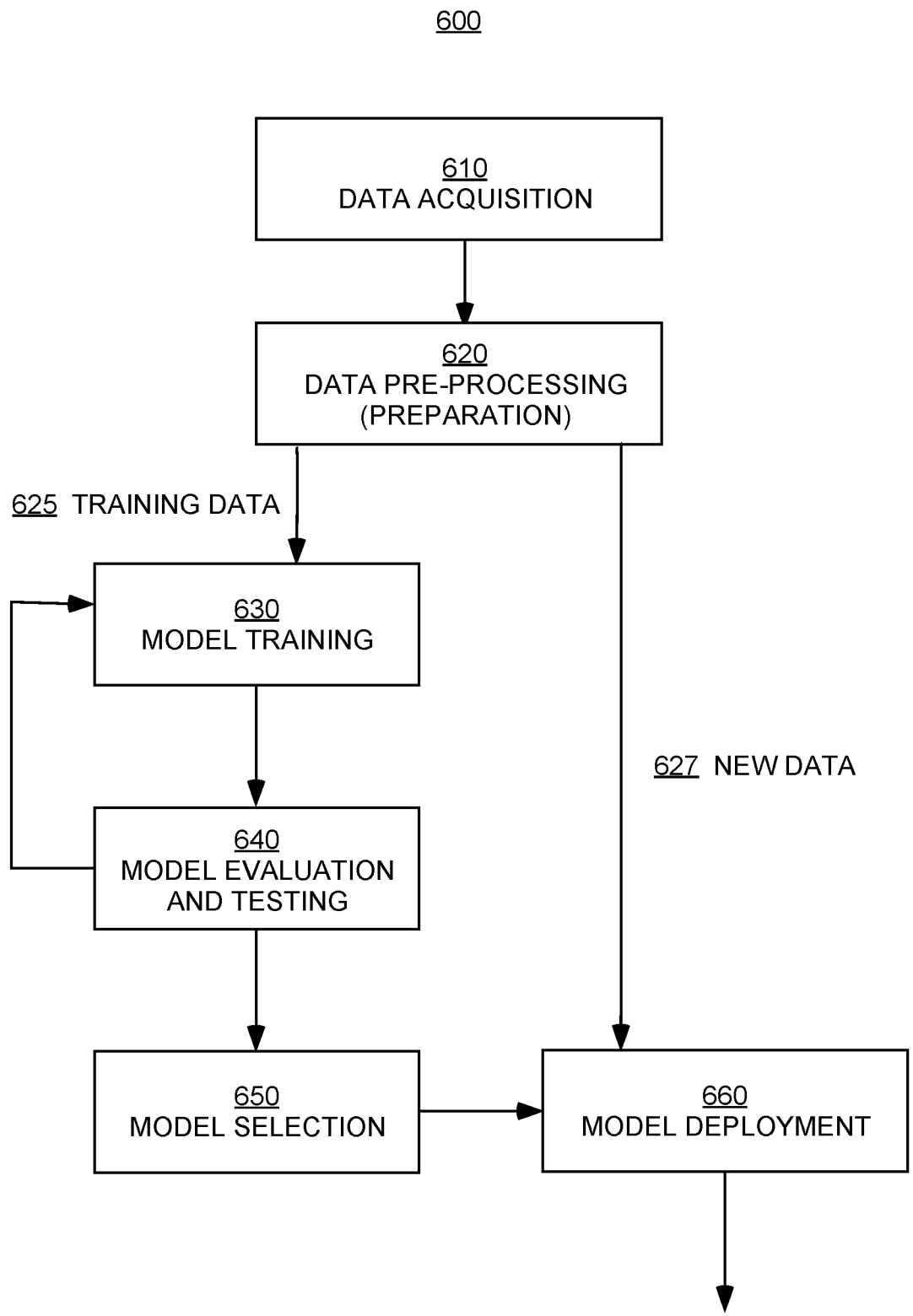
FIG. 6 shows an illustrative flow diagram for training a machine learning algorithm useful in some embodiments, according to exemplary embodiments of the present invention.

FIG. 6 shows an exemplary flow diagram 600 for training a machine vision or a machine learning (ML) algorithm, which may be utilized in object recognition, pose estimation, and object flow construction, according to exemplary embodiments of the present invention.

The training process begins at step 610 with data acquisition. At step 620, acquired data are pre-processed, or prepared. At step 630, a machine learning model is trained using training data 625. At step 640, the model is evaluated and tested, and further refinements to the model are fed back into step 630. At step 650, optimal model parameters are selected, for deployment at step 660. New data 627 may be used by the deployed model to make predictions.

A starting point for any machine learning method such as used by the machine learning component above is a documented dataset containing multiple instances of system inputs and correct outcomes (e.g., training data 625). This data set may be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. Thus, it would be understood by peoples of ordinary skill in the art that "training data" 625 as referred to in this subsection are directed to data for training a machine vision algorithm or a machine learning algorithm.

The quality of the output of the machine learning system output depends on (a) pattern parameterization, (b) learning machine design, and (c) quality of the training database. These components may be refined and optimized using various methods. For example, the database may be refined by adding datasets for new documented gestures and poses. The quality of the database may be improved, for example, by populating the database with cases in which the gestures and/or poses were correctly recognized. In one embodiment, the database includes data, for example, of mistaken identification of gestures and/or poses, which may assist in the evaluation of a trained system.

NEX Platform

Figure 7:
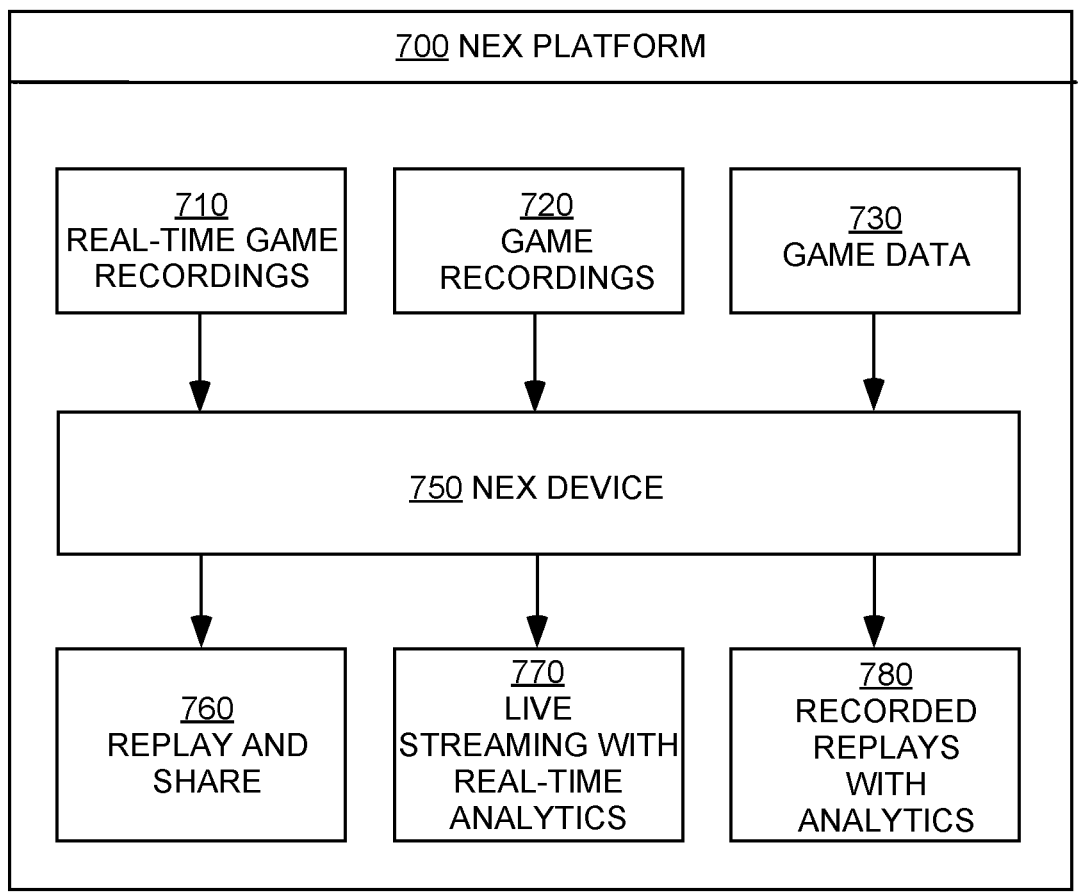
FIG. 7 is a schematic diagram illustrating an exemplary NEX platform, according to exemplary embodiments of the present invention.

FIG. 7 is a schematic diagram illustrating and summarizing some functionalities provided by an extended NEX platform 700, according to some exemplary embodiment of the present invention. In particular, a NEX device 750 may take in real-time streaming game recordings 710, on-demand streaming game recordings 720, game data 730, and facilitate game tracking to generate player analytics, then provide live streaming 770 with real-time analytics, recorded replays 780 with analytics, and any other replay and share functionalities 760.

Although NEX device 750 as shown in FIG. 7 serves as the core for a NEX platform 700, in some embodiments, NEX platform 700 may be networked among multiple user devices, where a NEX server implemented according to the embodiment shown in FIG. 3 may be connected to multiple camera-enabled user computing devices implemented according to the embodiment shown in FIG. 2, and each used to capture game data, and for providing game analytics. Such game video and/or analytics data may be uploaded to the NEX server, which in term may store and facilitate sharing of such data among individual players/users and teams.

Exemplary Convolutional Neural Networks (CNNs) for Pose Estimation

Figure 8A:
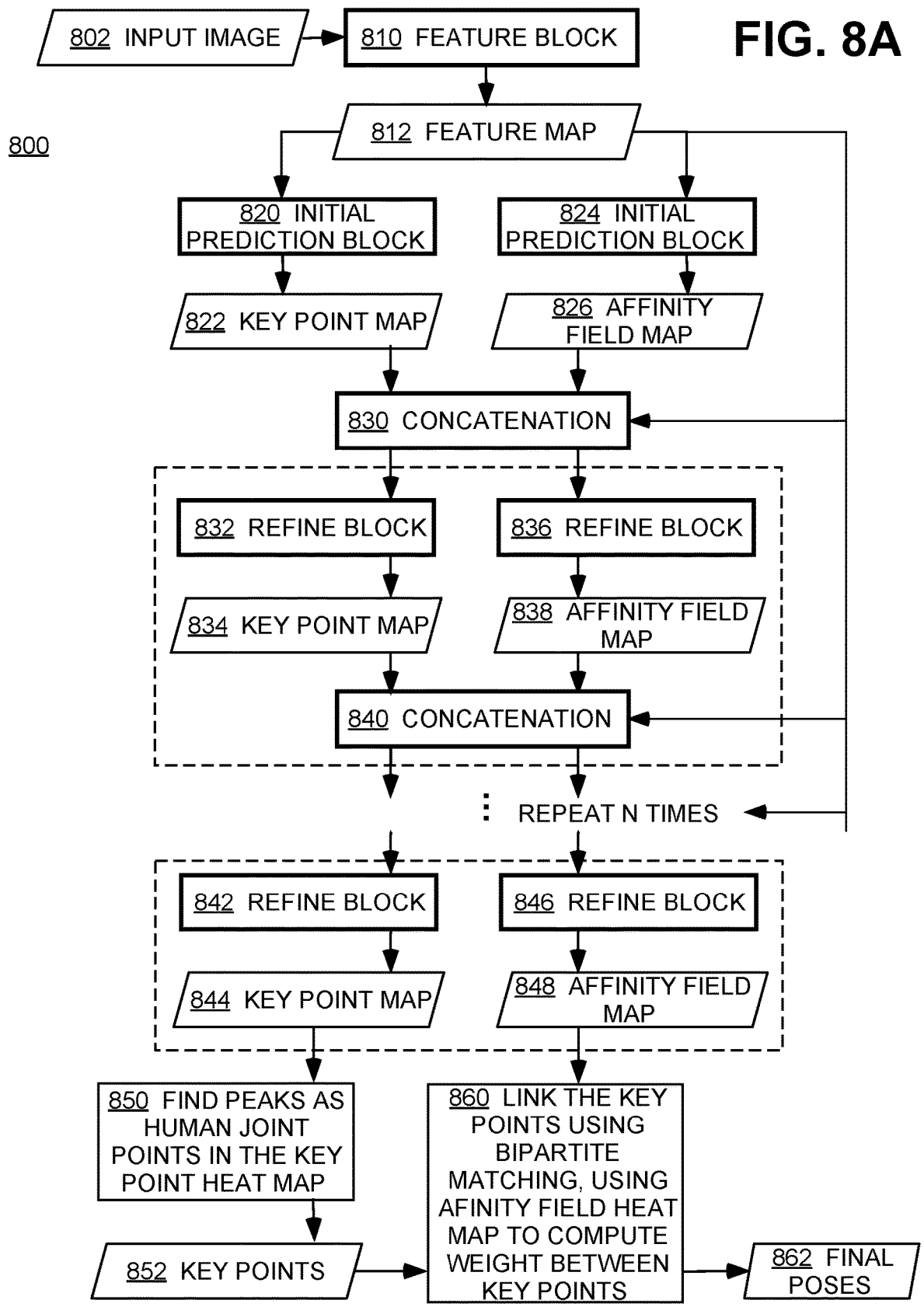
FIG. 8A is a block diagram of an exemplary neural network for player pose estimation, according to exemplary embodiments of the present invention.

FIG. 8A is a block diagram 800 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 8A performs the following steps to estimate the pose of one or more persons in an input image:

1. Use a convolutional network block as a feature extractor to compute a feature map from an input image;
2. Turn the feature map into a key point heat map and an affinity field heat map using another convolutional network block;
3. Refine the key point heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the key points using the affinity field heat map.

More specifically, an input image 802 is first passed through a feature block 810 to generate a feature map 812. Initial prediction blocks 820 and 824 then extract a key point map 822 and an affinity field map 826, respectively. A concatenation operation 830 is performed before further refinements are carried out in multiple iterations. For each stage of iteration, refine blocks such as 832, 836, 842, and 846 predict refined key point maps such as 834 and 844, and refined affinity field maps such as 838 and 848, respectively. Concatenation operations such as 840 are performed to generate input for the next stage. A total of N refinements may be carried out, where N may be any positive integer. For example, N may equal to 5 in some embodiments of the present invention. After the last refinement stage, key point heat map 844 is examined in step 850 to find peaks as human joint points or key points 852. Such key points may be linked in step 860 to generate final poses 862, by performing bipartite matching using affinity field heat map 848 to compute weights between key points. In this illustrative example, key point map 844 may comprise 18 channels, while affinity field map 848 may comprise 34 channels.

FIG. 8B is a detailed block diagram illustrating an exemplary Feature Block 810, according to some embodiments of the present invention. In this example, separable convolutional layers (SCL) are deployed with different kernel and stride sizes.

Correspondingly, FIG. 8C is a detailed block diagram illustrating an exemplary separable convolutional neural network layer 870, according to some embodiments of the present invention. A depth-wise separable convolution or a separable convolution layer factorizes a conventional, full convolution operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. Batch optimization and ReLU blocks further help improve the accuracy and performance of the network layer. Furthermore, in some embodiments, inverted residuals may be utilized to connect linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Figures 8D, 8E:
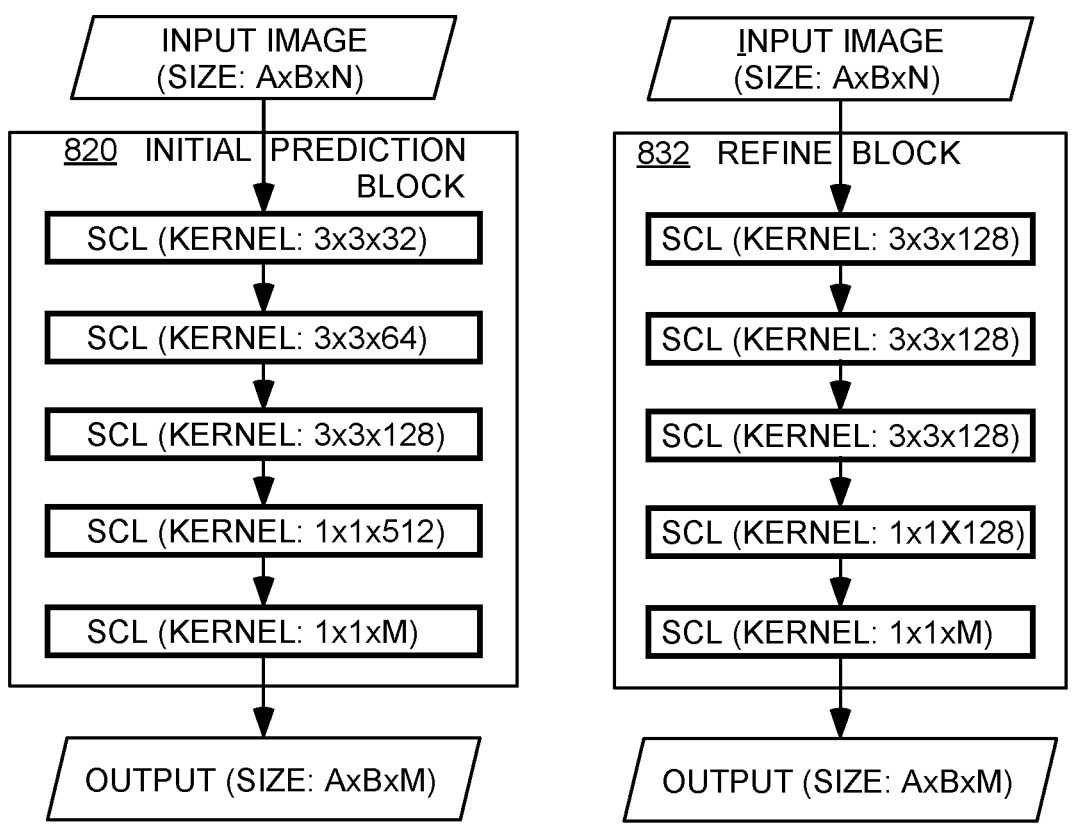
FIG. 8D is a detailed block diagram illustrating an exemplary Initial Prediction Block used in FIG. 8A, according to exemplary embodiments of the present invention.
FIG. 8E is a detailed block diagram illustrating an exemplary Refine Block used in FIG. 8A, according to exemplary embodiments of the present invention.

FIG. 8D is a detailed block diagram illustrating an exemplary Initial Prediction Block 820, according to some embodiments of the present invention. FIG. 8E is a detailed block diagram illustrating an exemplary Refine Block 832, according to some embodiments of the present invention. Both comprise multiple separable convolutional layers having different kernel sizes. The input, output, and kernel sizes shown in FIGS. 8D and 8E are for illustrative purposes only, and other similar hyperparameter values may be used in various embodiments of the present invention.

In some implementations of the present invention, one or more of existing software modules may be utilized, including but not limited to, CoreML for CNN object and key point detection, SceneKit for rendering an AR court, and CoreMotion for understanding a mobile device's orientation.

Exemplary Convolutional Neural Networks (CNNs) for Object Detection

A multiplayer ball game requires a ball and optionally other additional equipment such as a hoop, a backboard, court lines, and the like. The detection of moving and/or static non-human objects from the game video is needed to determine player actions and player analytics.

Figure 9A:
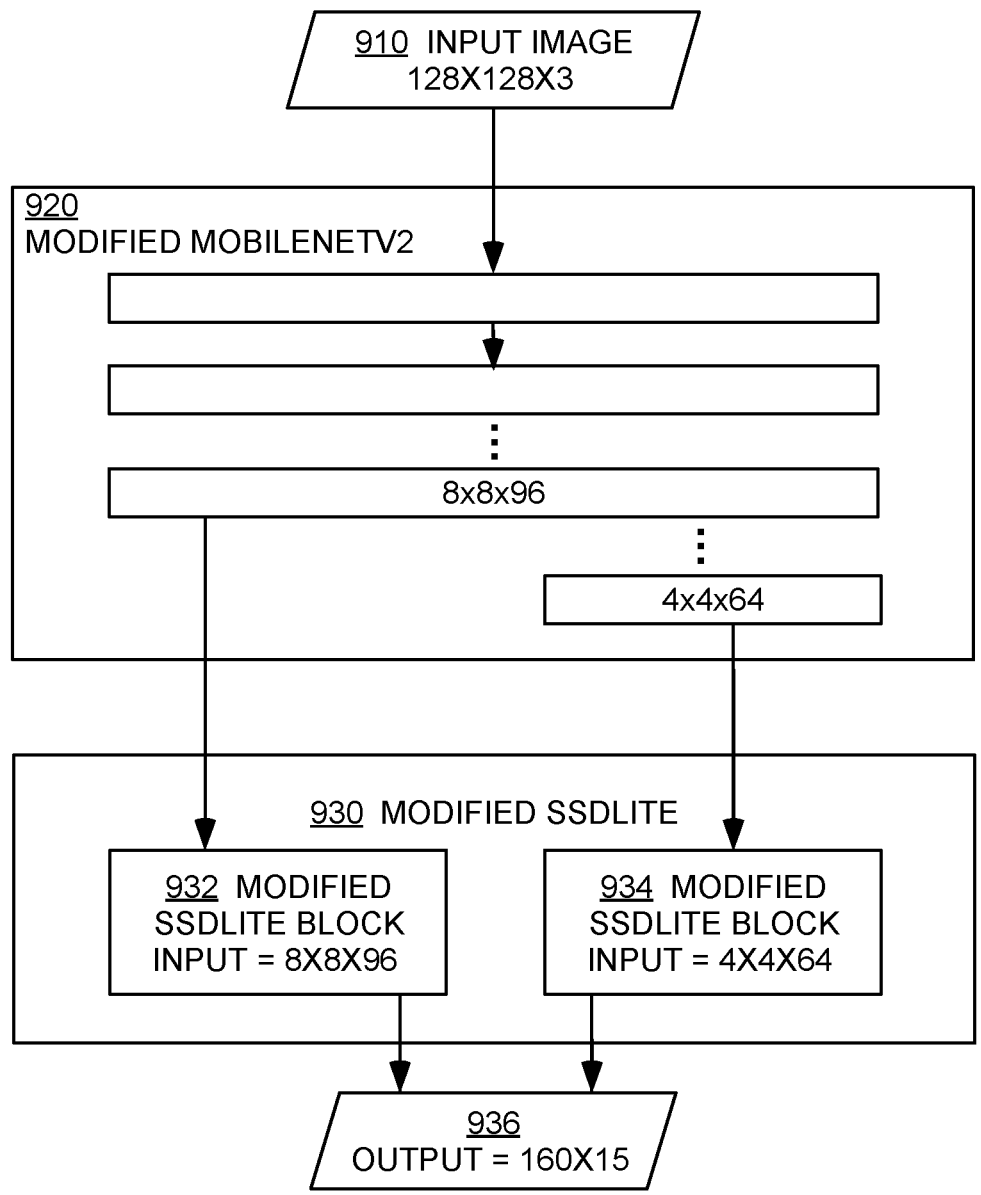
FIG. 9A is a block diagram of an exemplary neural network for ball detection, according to one embodiment of the present invention.
Figure 9B:
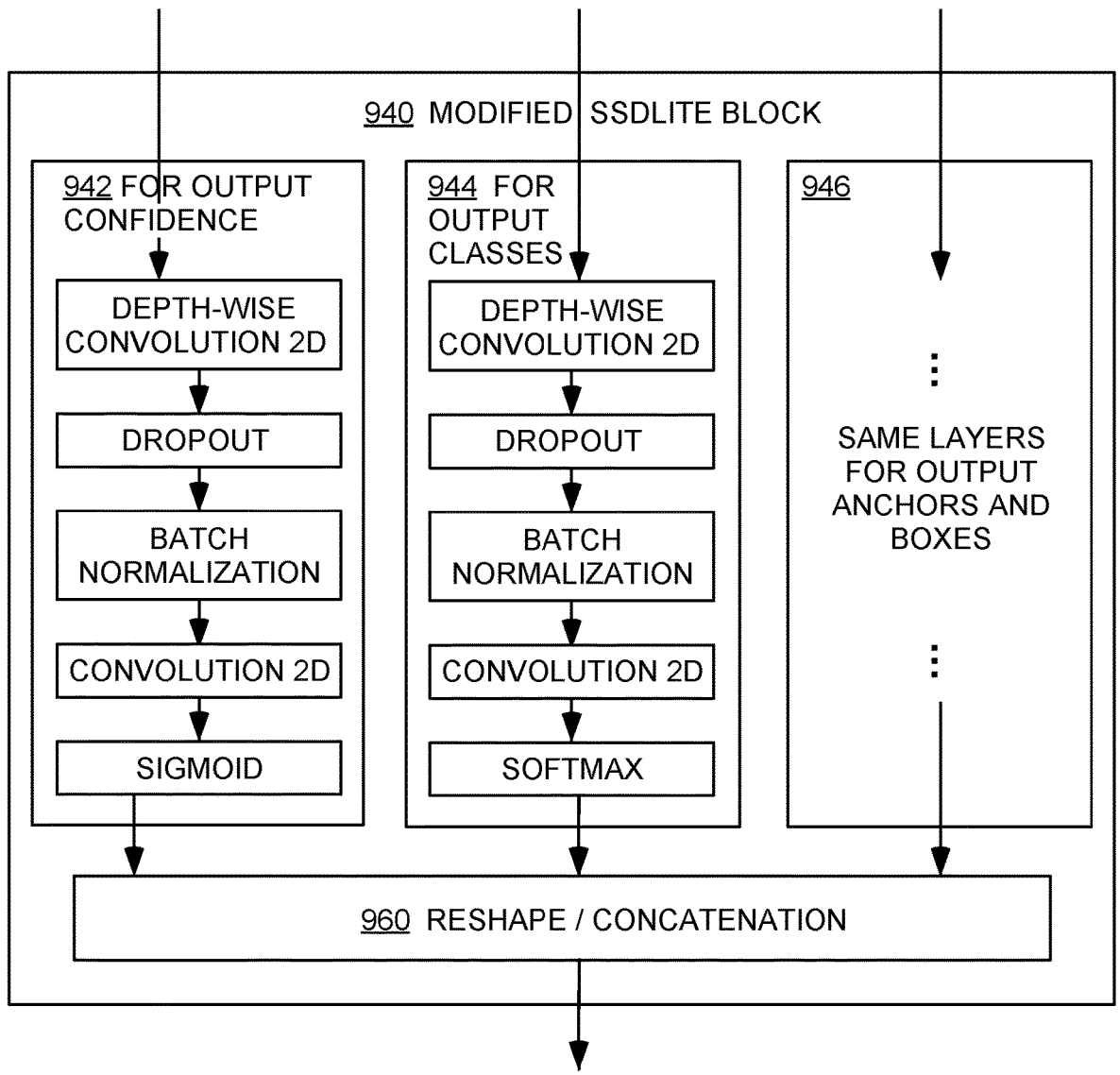
FIG. 9B is a detailed block diagram illustrating an exemplary Modified SSDLite Block used in FIG. 9A, according to one embodiment of the present invention.

FIGS. 9A and 9B are respective block diagrams of an exemplary neural network for ball detection, according to one embodiment of the present invention. This object detector is presented for illustrative purposes only, and some embodiments of the present invention may utilize other computer vision system designs for object detection.

FIG. 9A is a block diagram 900 of an exemplary neural network for ball detection, according to some embodiments of the present invention. In particular, FIG. 9A shows a CNN-based ball detector utilizing an optimized, modified MobileNetV2 framework as a feature extractor and a modified SSDLite framework for multi-scale object detection. An input image 910 is first processed through a Modified MobileNetV2 block 920, the output of which is processed through a Modified SSDLite module 930 comprising two Modified SSDLite blocks 932 and 934, to generate output 936. The input, output, and kernel sizes shown in FIGS. 9A and 9B are for illustrative purposes only, and other similar hyperparameter values may be used in various embodiments of the present invention.

MobileNetV2 is an efficient convolutional neural network design for resource-constrained, mobile device-based computer vision applications. A first key building block of MobileNetV2 is depth-wise separable convolutions, which factorize a conventional, full convolutional operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. A second key building block of MobileNetV2 is inverted residuals connecting linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Although not shown explicitly in FIG. 9A, in this exemplary embodiment, two MobileNetV2 output layers and 14 bottleneck operators may be used, a non-obvious reduction from the conventional setup with 6 MobileNetV2 output layers and 17 bottleneck operators. Such modifications optimize the feature extraction process to not only reduce the overall computational complexity but also improve the achievable accuracy by tailoring to the specific small input and ball detection goal.

FIG. 9B is a detailed block diagram illustrating an exemplary Modified SSDLite Block 940, such as 932 or 934 in FIG. 9A, according to some embodiments of the present invention. SSD refers to a Single Shot MultiBox Detector, a multi-object detection framework using a single deep neural network to discretize feature maps into multi-scale bounding boxes. SSD eliminates separate bounding box proposal generation and feature resampling stages to improve computation efficiency without compromising detection accuracy. SSDLite is a mobile-customized variant that utilizes depth-wise separable convolution in SSD prediction layers. Modified SSDLite block 940 shown in the exemplary embodiment of FIG. 9B further tailors and improves the accuracy of SSDLite by adding dropout layers.

More specifically, in Modified SSDLite Block 940, parallel network blocks 942, 944, and 946 are utilized to process the input data separately for output confidence, output classes, and output anchors and bounding boxes. Each block has the same architecture, comprising a depth-wise convolution in 2D space, dropout, batch normalization, further convolution, and a functional operation for classification. Feature maps thus generated are reshaped and/or concatenated via processing block 960 to generate output data.

For the ball detection task, two positive object classes may be considered: "ball" and "ball-in-hand." With conventional SSD or SSDLite framework, a single softmax function may be used to activate among background (e.g., no positive), and these two classes. By comparison, Modified SSDLite Block 940 is designed so that it may classify a ball out of a background, but does not always classify between ball and ball-in-hand for some training data. Such a design takes into account several factors. First, ball and ball-in-hand are not always distinguishable, even for a human. In addition to motion blur, background and other objects such as leg, arm, other people in the background could look like a hand in terms of shape and/or color. Second, having a classifier distinguish between ball and ball-in-hand may not always be worthwhile and may even compromise detection accuracy since there are "gray areas" where an input may be classified either way. Instead, within Modified SSDLite Block 940, a sigmoid function is used to produce confidence levels of whether a ball is present against a background, while a softmax function is used to classify between ball and ball-in-hand, or two output classes instead of three output classes for conventional SSD/SSDLite frames. As a further reduction to computational complexity, loss function and/or back propagation may be disabled if a given training case is in the "gray area."

Ground Mode Player-in-Scene Calibration and Player Location Determination

Returning to ground mode, in one aspect, in the case of the user device being positioned on, at, near, or substantially on the ground, the visibility of the ground from the mobile device's camera may be relatively low. Further, in some circumstances, the ground might not even be visible. Moreover, since the visibility of the ground far from the camera may be low, a relatively small measurement error (e.g., a few pixels of measurement error) in the image coordinates may lead to a computed distance error on the order of meters in the real-world coordinates. In various aspects, if the user device is determined to be positioned on the ground ("ground mode"), embodiments of the disclosure may use this determination to reduce the effects of these measurement errors. Further, information from a player-in-scene calibration procedure (described below) can also facilitate detection of the player's real-world ground location in subsequent video streams even though the ground is of low visibility or no visibility (and correspondingly, the player's foot location is not visible), provided that a camera projection associated with the camera of the user device remains valid (e.g., the mobile device has not been moved).

Accordingly, various embodiments of the disclosure are directed to a calibration procedure that may be used for a player-in-scene calibration in a gaming environment when the mobile device is placed at or near ground level. In particular, embodiments of the disclosure may be used to generate a first reference point (such as a "free throw" line) that may enhance the scene detection as performed by the user device. In another aspect, the first reference point may be used with a second reference point in the gaming environment (e.g., a hoop in the case of a basketball game). Accordingly, by using the two reference points and a given user device's sensor data (e.g., camera intrinsic matrix, accelerometer measurements, etc.), a camera projection (e.g., camera projection matrix) can be computed. Thereafter, the user device may be configured to estimate a real-world location of a player from the player's image location in a given video stream while a given camera projection associated with the calibration remains valid (e.g., while the camera projection matrix does not require recalculation resulting from a movement of the user device).

Figure 10:
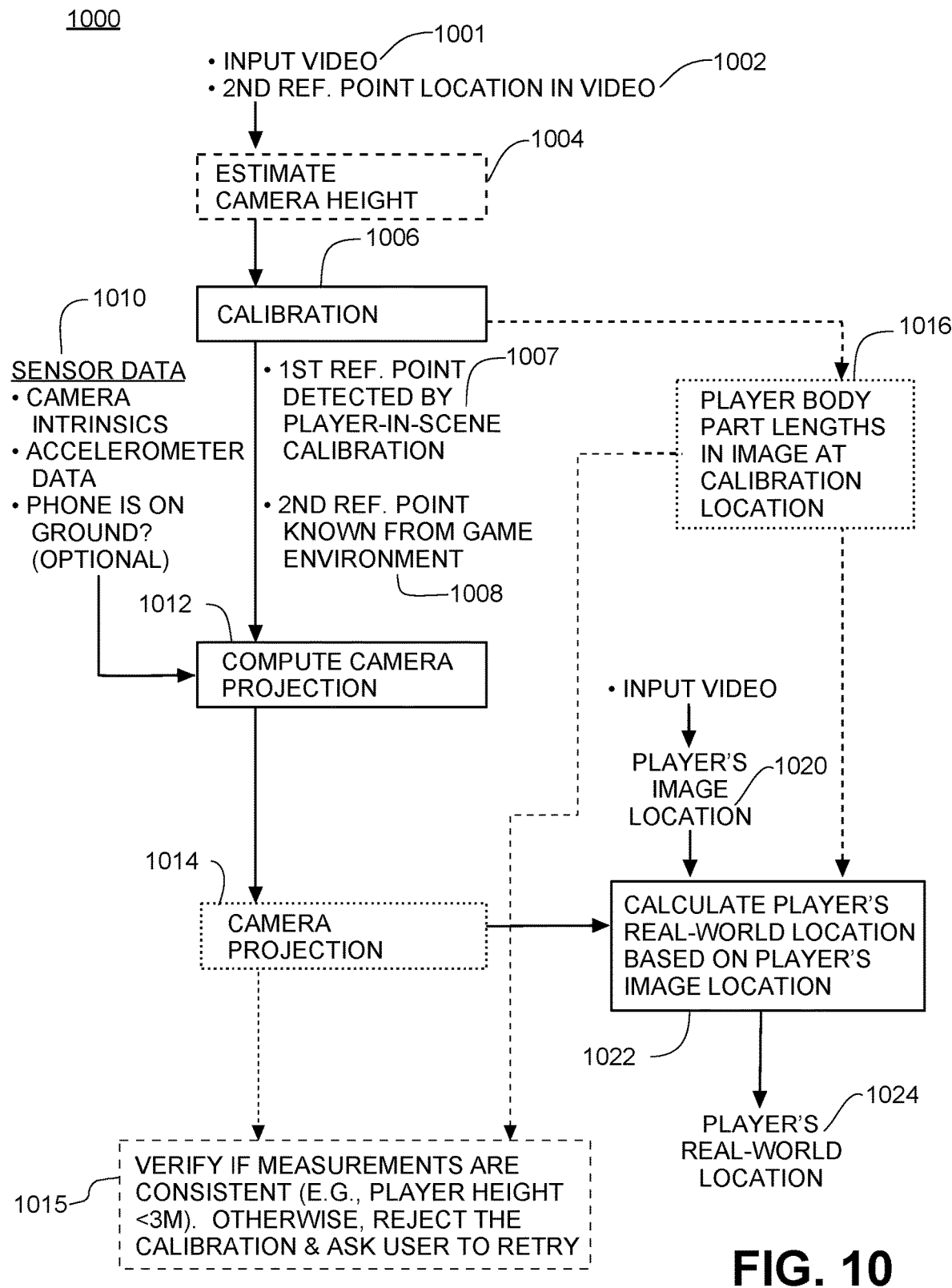
FIG. 10 shows a flowchart illustrating an exemplary process for determining a player's location in the real-world from the player's image location using a camera projection, according to some embodiments of present invention.

Accordingly, FIG. 10 shows a flowchart of an exemplary process 1000 for determining a player's location in the real world (e.g., on the ground in real-world coordinates), in accordance with example embodiments of the disclosure. In particular, process 1000 receives an input video 1001 and a second reference point location in the input video (e.g., hoop location) 1002 as input. The second reference point location (e.g., hoop location) 1002 in the input video 1001 may be determined using one or more machine vision algorithms as described above.

The process 1000 may begin with an optional camera height estimation block 1004, which verifies that the user device is in fact placed on the ground when the ground mode is selected by the user in the user application. Before proceeding to the calibration block 1006, the process estimates a camera height ($c_y$) of the user device from the ground using a known reference object of known size, for example, the size of the identified hoop (second reference point) and/or other visual cues in the input video. If the user places the user device significantly above the ground, but still selects ground mode, the process will proceed with the calibration block 1006, but using the foot location instead of the head location for the first reference point, assuming the foot location is visible in the input video 1001. The smart selection of the optimal body part for use as the first reference point, selected based on the camera height ($c_y$), is later used in the calibration block 1006.

Namely, in some circumstances, there is a chance that the user might have chosen ground mode in the user application while putting the mobile device significantly above the ground level, resulting in inaccurate player locations. By performing the camera height estimation block 1004, the process verifies if the ground is really poorly visible from the mobile device, and decides which body part to calibrate on. If the mobile device is high enough (e.g., above a given threshold), the foot plane (y=0) may still be visible, and the calibration block 1006 will calibrate using the player's foot location for the calibration procedure described below. This also eliminates the requirement that the mobile device must be placed strictly on the ground and provides robustness to the process. However, if the mobile device is low enough (e.g., below a given threshold), the foot plane will not be clearly visible. As a result, the calibration block 1006 will use some other body part (such as the player's head), which is more clearly visible from the mobile device. In other scenarios, where the camera height is not too low and not too high, the camera projection computation block 1012 will use the estimated camera height ($c_y$) in the camera projection matrix computation described below, which will also give better overall player location prediction results.

Next, calibration block 1006 uses the input video 1001, the second reference point location 1002, and optionally the camera height ($c_y$), to perform the calibration procedure using a player-in-scene calibration (described below). The calibration block 1006 may generate a first reference point correspondence 1007, for example, from the player-in-scene calibration procedure by noting the correspondence between the player's image location and the known real-world game environment location (e.g., when the player is standing at the "free throw" line). The calibration block 1006 may further generate a second reference point correspondence 1008 (e.g., a hoop correspondence) by noting the correspondence between the second reference point's image location and the known real-world game environment location (e.g., hoop location). Further, the calibration block 1006 may optionally output the player body part lengths in the image at the calibration location 1016 to be used to assist with calculating the player's real-world location later (as described below). Optionally, the calibration block 1006 may also receive the camera height ($c_y$) and the preferred body part to calibrate on from the camera height estimation block 1004 as described above.

During the calibration procedure, the player-in-scene calibration process may require that the player position themselves at a predetermined location (e.g., a first feature location) in the scene of the gaming environment. For example, in the case of a basketball game, the player may be requested to stand at a free-throw line on the basketball court and raise their hands, or the player may be requested to shoot a free throw from the free-throw line on the basketball court. In one aspect, the player-in-scene calibration procedure may include a determination of a first reference point. In particular, by detecting the player at a first feature location (e.g., free-throw line), a first reference point can be extracted. In another aspect, embodiments of the disclosure may use one or more images from the input video to determine the image location of one or more body parts of the player (e.g., feet, head, chest), and further determine the corresponding real-world location of the one or more body parts of the player (e.g., at the free-throw location). Moreover, the first reference point may be used together with the second reference point at a known second feature location (e.g., a hoop location in a basketball court). Therefore, two reference points are obtained, the first reference point from the player-in-scene calibration procedure, and the second reference point from the known feature location (e.g., hoop).

Next, camera projection computation block 1012 may compute a camera projection 1014 (e.g., camera projection matrix P) from the output of the calibration block 1006 and sensor data 1010 (e.g., camera intrinsic matrix, accelerator data, and whether or not the phone is on the ground). Namely, the first reference point correspondence detected by the player-in-scene calibration 1007 and the second reference point correspondence known from the game environment 1008 may be used together with the sensor data 1010 to compute the camera projection 1014. In one embodiment, the sensor data comprises camera intrinsics associated with the camera (e.g., as represented by a camera intrinsic matrix, and including parameters such as compass focal length, image sensor format, principal point, and the like). In another embodiment, the sensor data further comprises accelerometer readings associated with the mobile device. The camera projection computation block 1012 uses the first reference point correspondence, the second reference point correspondence, and the sensor data to compute a camera projection matrix P using matrix math, as described in greater detail below.

Afterwards, the camera projection 1014 may be used by the player location calculation block 1022 to calculate a player's real-world location 1024 (e.g., location on the ground of a gaming environment) based on the player's image location 1020. The player location calculation block 1022 obtains the player's image location 1020 in a given video frame of the input video 1001 from one or more machine vision algorithms as described above. The player location calculation block 1022 uses the player's image location 1020 together with the camera projection 1014 (obtained during calibration) and calculates the player's real-world location 1024. Illustrative equations for calculating the camera projection matrix P and the player's real-world location (x,y,z) from the player's image location (u,v) and the camera projection matrix P are described below in illustrative Eqns. (1)-(6).

Optionally, the results of the player body part lengths at the calibration location 1016 obtained in the calibration block 1006 may be used as input to the player location calculation block 1022 to assist with player location determination. That is, a calibration may be performed on one or more player body parts during the calibration block 1006. For example, optionally, during the player-in-scene calibration procedure in calibration block 1006, the dimensions (e.g., lengths) of one or more of a given player's body parts (e.g., arm, leg, height, chest, and the like), may be determined, for example, using an AI-based algorithm such as pose detection described above. Moreover, such body parts' dimensions are measured at a predetermined location (e.g., free-throw line), and therefore, may be used to calculate the same player's depth (e.g., distance from the user device's camera) at the same or different video frame. The player's depth may be used to determine the player's real-world location more accurately in the player location calculation block 1022.

In some embodiments, a verification block 1015 is used to reject the user's calibration shot from the calibration block 1006 if the process determines that the user is not calibrating at the designated spot (e.g., free-throw line). As described above, the process can estimate the player body part lengths 1016, for example, the height of the player. Sometimes, the estimated player body part lengths 1016 will be outside of a known range (e.g., the player's estimated height is greater than 3 meters, or less than 0 meters). In other scenarios, the camera projection (e.g., camera projection matrix) 1014 may be outside known bounds. Such situations could arise if the user calibrated from a wrong location (e.g., under the hoop instead of at the free-throw line). In such scenarios, the system will ignore the calibration data from the calibration block 1006, and ask the user to retry calibration again in calibration block 1006 (for example, by repeating the calibration instructions back to the user and asking for recalibration by the user).

In various aspects, the camera height estimation block 1004, the calibration block 1006, and the camera projection computation block 1012 may be considered as setup blocks (e.g., initialization steps) that only need to be performed once per mobile device placement. The setup blocks 1004, 1006, and 1012 only need to be performed again if the mobile device is moved or its position, angle, or orientation is changed or adjusted. In another aspect, the camera projection block 1014 and the player body part lengths block 1016 (shown in dotted boxes) may be considered as application states; that is, states that correspond to computational states of the application implementing the techniques described in connection with diagram 1000. Lastly, the player location calculation block 1022 may be considered as a non-setup block, and may be used to repeatedly calculate (or update) the player's real-world location from the player's image location as the player moves in the gaming environment using the same camera projection 1014 for as long as the camera project 1014 remains valid (e.g., the mobile device has not been moved).

Calculating Camera Projection from Reference Point Correspondences and Sensor Data General Case In some embodiments, the camera projection (e.g., camera projection matrix P) may be calculated from the first reference point correspondence, the second reference point correspondence, and sensor data. In one aspect, a camera projection matrix P for a general case of the user device being positioned in any suitable way using two reference points may be computed as follows.

The first and the second reference point coordinates in the image plane (u,v) correspond to the first and the second reference point coordinates in the real-world coordinates (x,y,z). The image coordinates (u,v) of the first and the second reference points are detected using one or more machine vision algorithms as discussed above. The real-world coordinates (x,y,z) of the first and the second reference points are known (e.g., free-throw line and hoop location). In one preferred coordinate system, y represents the vertical direction (e.g., "height" above the ground), and x and z represent the court directions in the court plane.

Relating the two reference point correspondences, a camera intrinsic matrix A, and accelerometer data, the camera projection matrix P can be expressed implicitly as:

$$\lambda \begin{pmatrix} u \\ v \\ 1 \end{pmatrix} = P \begin{pmatrix} x \\ y \\ z \\ 1 \end{pmatrix} = AR_{roll}R_{pitch}R_{yaw} \begin{pmatrix} x - c_x \\ y - c_y \\ z - c_z \end{pmatrix} \quad \text{(Eq. 1)}$$

where (x,y,z) denotes the reference point's real-world location, (u,v) denotes the reference point's image location in the image plane, $(c_x, c_y, c_z)$ denotes the camera location, $R_{roll}$, $R_{pitch}$, $R_{yaw}$ denote the 3D rotations of the camera along the respective directions, A denotes the camera intrinsic matrix, and λ is a scalar.

Further, the roll angle ($R_{roll}$) and the pitch angle ($R_{pitch}$) can be computed from the accelerometer data obtained from the user device. As a result, $F = AR_{roll}R_{pitch}$ may be determined based on the camera intrinsic matrix A and the accelerometer data.

Further, with the two reference point correspondences, there will be a total of six equations and six unknowns, namely in the six unknowns $c_x, c_y, c_z, \theta, \lambda_1, \lambda_1$. (Setting $\theta = R_{yaw}$). Therefore, by solving these six equations for the six unknowns, the camera projection matrix P can be determined.

User Device on Ground Case (Ground Mode)

In another aspect, a camera projection matrix P for a second case corresponding to the user device being positioned on or near the ground using two reference points may be computed as follows. In one aspect, the lower the user device is located vis-à-vis the ground, the less visible the ground may be, particularly on the far end of the scene (see FIG. 1B). Accordingly, a few pixels of measurement error in a given axis (e.g., the y-axis of a foot image location associated with a given player) may lead to real-world distance error in the scale of meters.

In various embodiments, the present invention may provide the advantage of reducing such measurement errors by implementing one or more of the following steps. In one aspect, a user may be requested to position the user device on the ground. The system may thereby assume, for the purposes of calculation, that the camera device height ($c_y$) as being equal to a value of 0 after the user device is placed on the ground ($c_y = 0$). By making such an assumption, images of other body parts (e.g., head, arms, neck, etc.) may be used as a reference point instead of a foot location; such a technique may be especially useful if the foot is not visible.

As noted above, a camera projection matrix P may be expressed implicitly as:

$$\lambda \begin{pmatrix} u \\ v \\ 1 \end{pmatrix} = P \begin{pmatrix} x \\ y \\ z \\ 1 \end{pmatrix} = AR_{roll}R_{pitch}R_{yaw} \begin{pmatrix} x - c_x \\ y - c_y \\ z - c_z \end{pmatrix} \quad \text{(Eq. 2)}$$

where (x,y,z) denotes the reference point's real-world location, (u,v) denotes the reference point's image location in the image plane, $(c_x, c_y, c_z)$ denotes the camera location, $R_{roll}$, $R_{pitch}$, $R_{yaw}$ denote the 3D rotations of the camera along the respective directions, A denotes the camera intrinsic matrix, and λ is a scalar. (Eq. 2 is the same as Eq. 1).

Let $F = AR_{roll}R_{pitch}$, which may be computed from the camera intrinsic matrix A and the accelerometer data (roll angle $R_{roll}$ and pitch angle $R_{pitch}$), as described above. Moreover, using a stable reference point (e.g., a hoop), the following equation will hold (h for hoop):

$$\lambda_h F^{-1} \begin{pmatrix} u_h \\ v_h \\ 1 \end{pmatrix} = F^{-1} AR_{roll}R_{pitch}R_{yaw} \begin{pmatrix} x_h - c_x \\ y_h - c_y \\ z_h - c_z \end{pmatrix} = R_{yaw} \begin{pmatrix} x_h - c_x \\ y_h - c_y \\ z_h - c_z \end{pmatrix} \quad \text{(Eq. 3)}$$

By making the assumption that $c_y = 0$ (camera height is zero for a device placed on the ground), the value for $\lambda_h$ can be solved, and the left-hand side of Eq. (3) can be determined.

However, Eq. (3) provides only two equations on three unknowns $c_x, c_z, \theta$ (setting $\theta = R_{yaw}$). In one aspect, vertical dimension (y) may be numerically unstable. As a result, the contribution from the y-axis component can be ignored in the equation (p for body part of player):

$$\lambda_p F^{-1} \begin{pmatrix} u_p \\ v_p \\ 1 \end{pmatrix} = R_{yaw} \begin{pmatrix} x_p - c_x \\ y_p - c_y \\ z_p - c_z \end{pmatrix} \quad \text{(Eq. 4)}$$

Eq. (4) may also provide the freedom to use any reference point correspondence above the predetermined $x_p, z_p$. For example, embodiments of the disclosure may make use of a given player's head if the player's feet are not visible, as described above.

Moreover, Eq. (4) leads to two additional equations involving $c_x, c_z, \theta, \lambda_p$ (setting $\theta = R_{yaw}$). Accordingly, there will be a total of four equations with four unknowns, which can be solved to determine the camera projection matrix P.

Optimizing Camera Intrinsic Matrix and Accelerometer Readings

Although $F = AR_{roll}R_{pitch}$ may be computed from the camera intrinsic matrix and one or more accelerometer readings from the user device as described above, practically, many of the actual mobile devices often report inaccurate camera intrinsics or carry faulty accelerometers. These sensor inaccuracies would then propagate to inaccuracies in the resultant F matrix, and subsequently inaccurate predictions of the player's real-world location. In order to address these sensor inaccuracies, in some embodiments, during the shooting session, for every detected shot, the system may also record the camera intrinsic matrix and the accelerometer data together with the player's pose information. When the player ends the shooting session, the system may take all the recorded information, and run a global optimization to recompute the shot locations. By analyzing more (e.g., ten or more) shots together, the system can reduce some of the device errors and improve the overall shot location accuracy. Usually, real mobile devices have some erroneous biases, which are carried over to the subsequent computations, leading to inaccurate player location estimations. By combining the user device and the user pose information from various shots (preferably from different locations on the court), the system can deduce the biases of the camera intrinsic matrix and/or accelerometer readings, and compensate for these biases during subsequent computations. This enhancement usually results in a substantially better shot chart.

Calculating Player's Real-World Location from Player's Image Location

Foot Visible and Fit for Use Case

In one aspect, embodiments of the disclosure may determine a player's real-world ground location (x,y,z) based on the player's image location (u,v); that is, using the player's foot location in the image (u,v). As long as the camera projection matrix P computed above remains valid, the determination of the player's real-world ground location (x,y,z) based on the player's image location (u,v) may be determined as follows.

In particular, by applying the camera projection matrix P to the player's foot location in the image (u,v) and setting y=0, a real-world ground coordinate (x,0,z) for the player can be obtained. This case is based on the assumption that the player's foot is visible in the image and is suitable for use in the calculation that follows (e.g., enough pixels of the foot are visible to give an accurate image location for the foot, etc.)

Accordingly, assuming the player's foot is visible in a given image plane, it is possible to determine the player's real-world ground location (x,0,z) from the player's image location (u,v) and the camera projection matrix P by solving the equation:

$$\lambda \begin{pmatrix} u \\ v \\ 1 \end{pmatrix} = P \begin{pmatrix} x \\ 0 \\ z \\ 1 \end{pmatrix} \text{ where } y = 0 \text{ for foot plane} \quad \text{(Eq. 5)}$$

In particular, in Eq. (5), there will be three unknowns $\lambda, x, z$ with three equations, and therefore the system of equations is solvable for the player's real-world coordinates (x,0,z).

Foot not Visible or not Fit for Use Case

Some common conditions arise where the foot measurements are deemed not fit to be used because either the foot is not visible in the image(s), the user device is positioned on the ground and has low ground visibility, and/or the number of pixels of the foot plane in an acquired image is not sufficient. In one aspect, if the foot location is not available, another body part may be used instead. In this scenario, if the player in a given image is the same player who was used during the player-in-scene calibration procedure (described above), in one embodiment, another body part may be used to calculate the real-world coordinates of the player.

Namely, if the foot location is not available, other body parts of the player may be used instead, including, but not limited to, the head or the chest of the player. In such a case, the corresponding y (e.g., body part height from the ground) for that body part will need to be determined. In one aspect, during the player-in-scene calibration procedure described above, the preferred body part on the player can be extracted. Then, the following equation can be solved (p for body part of player):

$$\lambda \begin{pmatrix} u_p \\ v_p \\ 1 \end{pmatrix} = P \begin{pmatrix} x_p \\ y \\ z_p \\ 1 \end{pmatrix} \text{ where } y \text{ corresponds to body part height} \quad \text{(Eq. 6)}$$

where $(x_p, y, z_p)$ denotes the player body part's real-world location, $(u_p, v_p)$ denotes the player body part's image location, P is the camera projection matrix, and $\lambda$ is a scalar. Accordingly, with three equations, y in Eq. (6) may be solved for subsequent usage.

Example of Ground Mode Player-in-Scene Calibration Procedure

Example operations described herein, and in particular, the example operations described above in connection with FIGS. 1A to 10 may be performed by a NEX application running on a mobile device, such as shown and described in connection with FIG. 2 above.

An example use case is provided in references to FIGS. 11-17, where the user device (e.g., a mobile phone) is positioned on the ground with tracking of players taking basketball shots to illustrate aspects of how a player-in-scene calibration procedure works. Further, while the example is shown for the case where the user device is positioned on the ground, aspects of the example can apply to other cases where the player-in-scene calibration procedure is appropriate to use.

Figure 11:
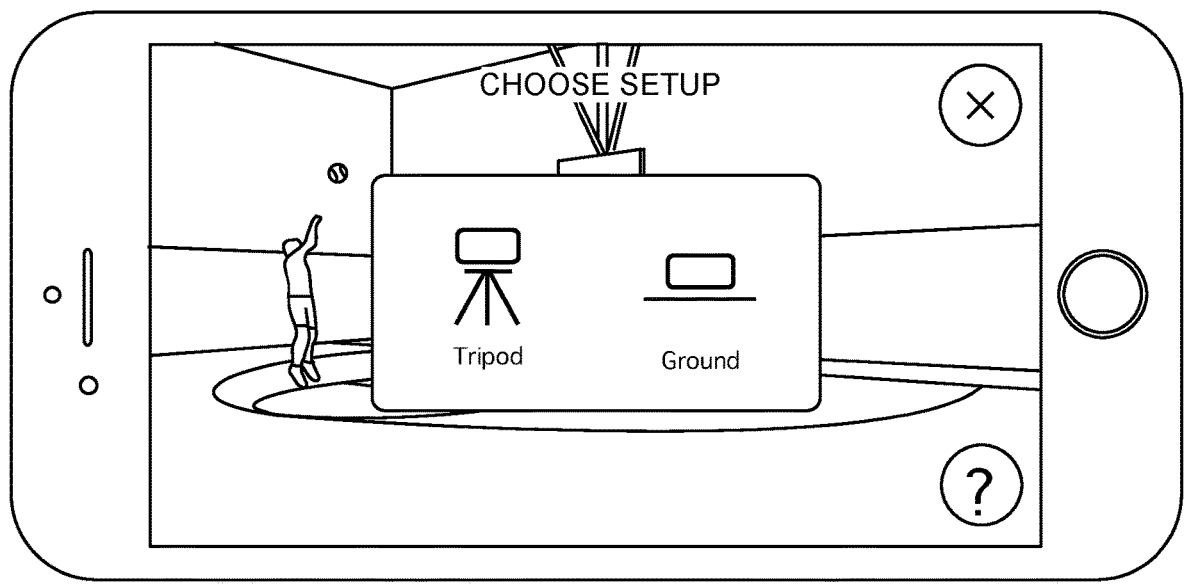
FIG. 11 shows a diagram representing an example application running on a user device in which either tripod or ground mode may be selected, in accordance with example embodiments of the disclosure.
Figure 12:
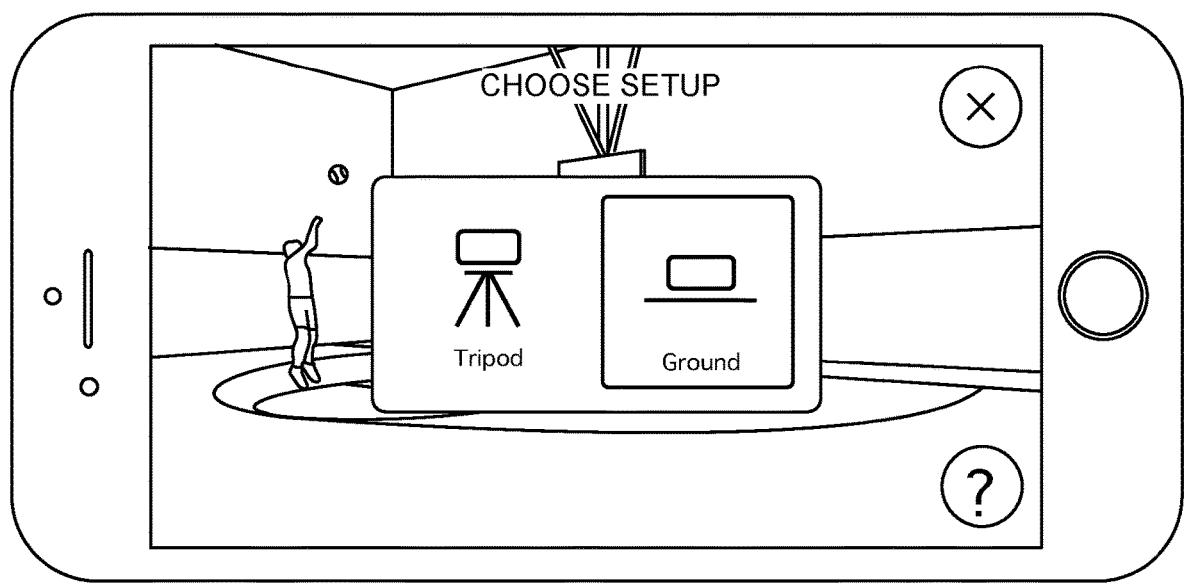
FIG. 12 shows a diagram representing an example application running on a user device, in which ground mode has been selected, in accordance with example embodiments of the disclosure.

In particular, FIG. 11 shows a diagram 1100 representing an application running on a user device (e.g., a mobile phone), in accordance with example embodiments of the disclosure. Further, diagram 1100 may represent an information gathering step presented to a user of the user device. The information gathering step may allow the user to select a "tripod mode" or a "ground mode" for use with the application running on the user device. Further, FIG. 12 shows another diagram 1200 representing the application running on the user device. In particular, diagram 1200 represents the information gathering step receiving a selection by the user choosing the ground mode of operation for the application running on the user device.

Figure 13:
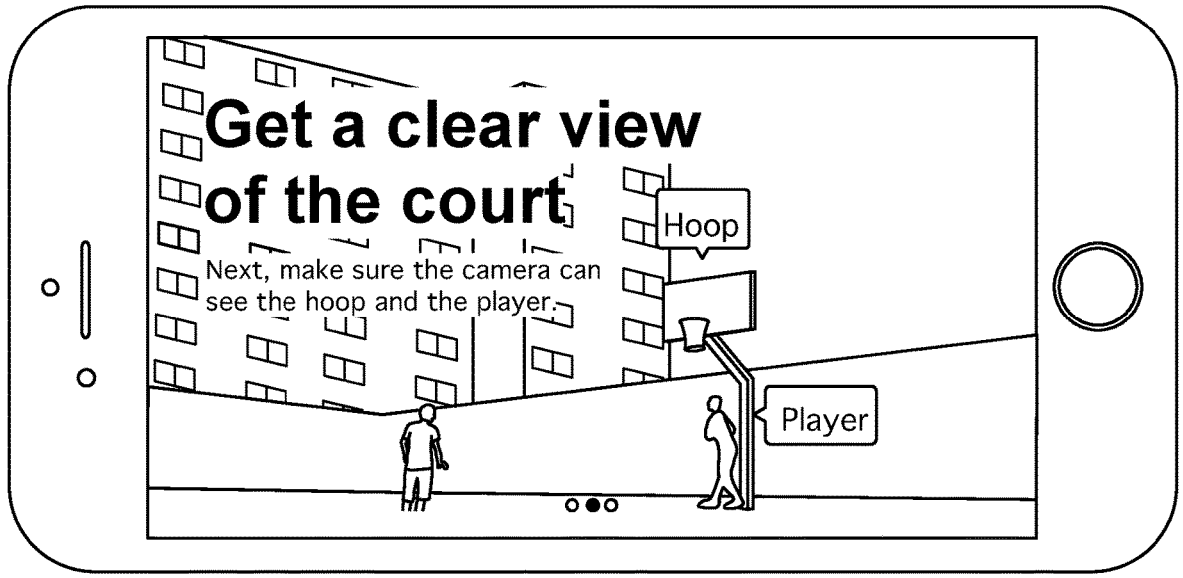
FIG. 13 shows a diagram representing an example application running on a user device, in which user instructions for placing the user device on or near the ground in the selected ground mode are presented, in accordance with example embodiments of the disclosure.
Figure 14:
FIG. 14 shows a diagram representing an example application running on a user device, in which additional user instructions for calibrating the ground mode are presented, in accordance with example embodiments of the disclosure.

As shown in FIGS. 13 and 14, the application may then show the user a "ground mode guide" which may include user instructions before the player-in-scene calibration procedure is initiated. FIG. 13 shows a diagram 1300 representing an example application running on a user device, in which user instructions for placing the user device on or near the ground in the selected ground mode are presented. FIG. 14 shows a diagram 1400 representing an example application running on a user device, in which additional user instructions for calibrating the ground mode are presented. The user may then be prompted to select "continue" in diagram 1400 to proceed with the player-in-scene calibration procedure executed by the application.

Figure 15:
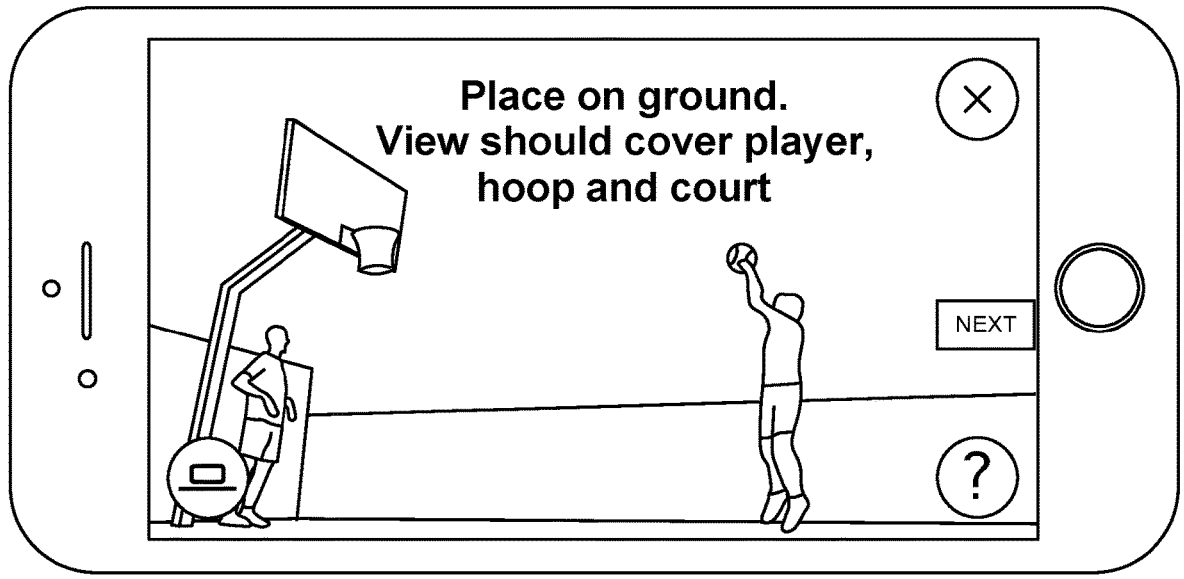
FIG. 15 shows a diagram representing an example application running on a user device, in which additional user instructions for calibrating the ground mode are presented, in accordance with example embodiments of the disclosure.
Figure 16:
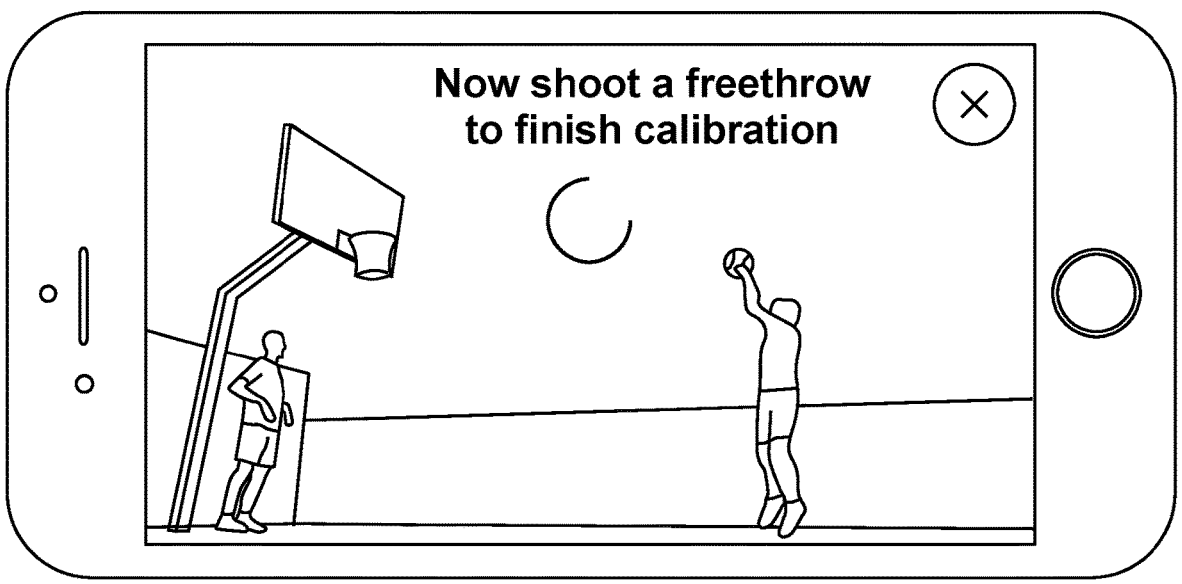
FIG. 16 shows a diagram representing an example application running on a user device, in which the player is instructed to throw a "free throw" in order to finish calibration of the ground mode while the device calibrates utilizing the video data from the free throw, in accordance with example embodiments of the disclosure.

As shown in diagram 1500 of FIG. 15, the application may then provide instructions to the user in order for the user to position the user device to cover the player and important portions of the gaming environment (e.g., basketball hoop) in the user's field of view. After the user clicks "next," the application may then detect a second reference point, such as a hoop, and request the player to shoot a free throw from a first reference point, such as the free-throw line, as part of a calibration procedure. FIG. 16 shows a diagram 1600 representing an example application running on a user device, in which the player is instructed to throw a "free throw" in order to finish calibration of the ground mode while the device calibrates utilizing the video data from the free throw.

Figure 17:
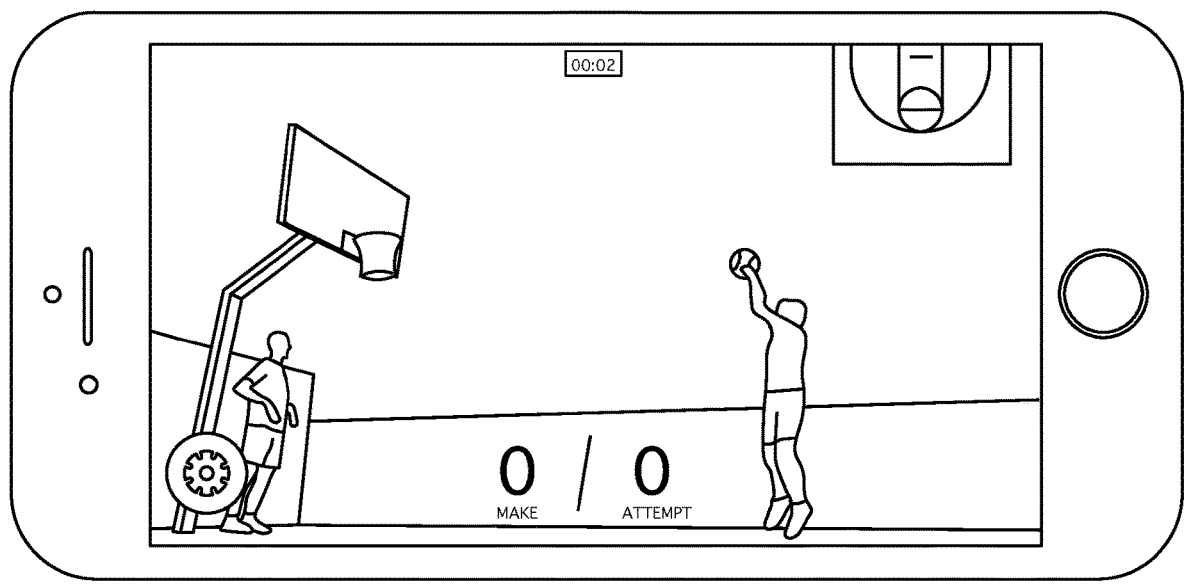
FIG. 17 shows a diagram representing an example application running on a user device, in which the ground mode has been activated and successfully calibrated, and in which player shot attempts can now be accurately tracked, in accordance with example embodiments of the disclosure.

After the calibration is completed, as shown in diagram 1700 of FIG. 17, the player may shoot as usual, and the real-world ground location of the player may be detected and plotted, for example, in a shot chart, as described above and in the related applications cited above.

Figure 18:
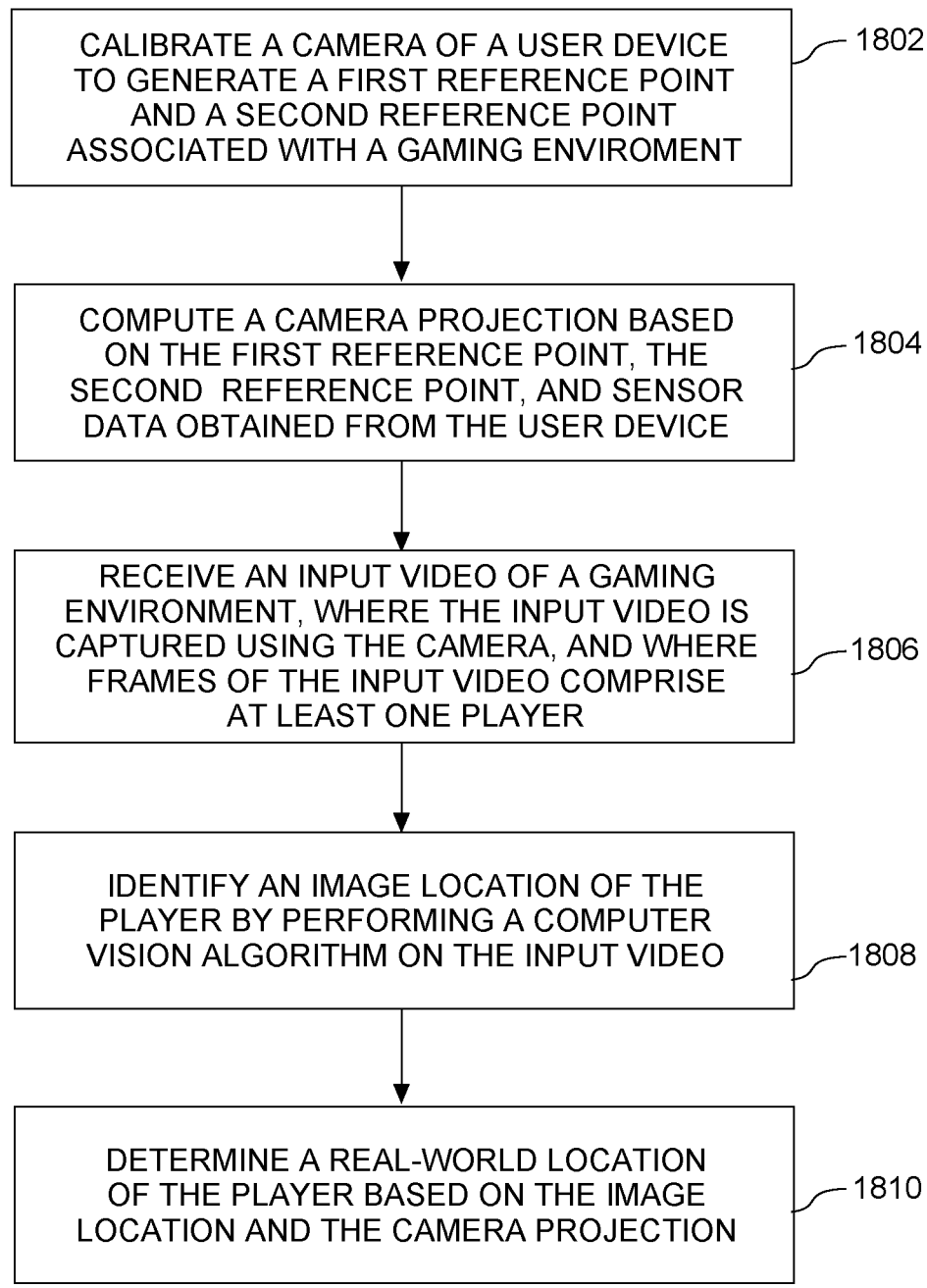
FIG. 18 shows a flowchart illustrating a method for determining a player's real-world location on the ground from the player's image location using a camera projection obtained from calibrating the user device, in accordance with example embodiments of the disclosure.

Finally, FIG. 18 shows a flow chart 1800 representing example operations for determining the real-world location of a player in a gaming environment from the player's image location, in accordance with example embodiments of the disclosure. At step 1802, a camera of the user device may be calibrated to generate a first reference point correspondence and a second reference point correspondence associated with the gaming environment, as described above. At step 1804, a camera projection may be calculated based on the first reference point, the second reference point, and sensor data obtained from the user device, as described above. The sensor data may comprise the camera's intrinsic matrix and accelerator data from the user device. At step 1806, an input video of a gaming environment may be received, where the input video is captured using the camera, and where frames of the input video comprise at least one player in the gaming environment. At step 1808, an image location of the player may be identified by performing a computer vision algorithm on the input video. Finally, at step 1810, a real-world location of the player may be determined based on the image location and the camera projection.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although the present invention has been described with reference to basketball as one specific exemplary embodiment, one of ordinary skill in the art would recognize that the present invention may be applied to other games, including but not limited to baseball, golf, soccer, American football, and so forth. One of ordinary skill in the art would recognize that the methods and systems taught in the present disclosure can be applied, without loss of generality, to various games, various game analytics, and various game scoring methods.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for detecting location of at least one player in a gaming environment, comprising:
receiving calibration data from a camera of a user device, the calibration data comprising a first reference point associated with the gaming environment, a second reference point associated with the gaming environment, and sensor data associated with the user device, wherein the first reference point corresponds to a player's location at a first feature location in the gaming environment during calibration;

computing a camera projection based on the first reference point, the second reference point, and the sensor data obtained from the user device;

receiving an input video of the gaming environment, wherein the input video is captured using the camera, and wherein frames of the input video comprise at least one player in the gaming environment;

identifying an image location of the at least one player by performing a computer vision algorithm on the input video; and determining a real-world location of the at least one player based on the image location and the camera projection.

2. The method of claim 1, wherein the user device is positioned on a ground level or substantially proximate to the ground level.

3. The method of claim 1, wherein the calibration data is generated by calibrating the camera by providing instructions to position the player at the first feature location in the gaming environment corresponding to the first reference point.

4. The method of claim 1, wherein the first reference point is determined based at least in part on a determination of a body part of the player located at the first feature location.

5. The method of claim 4, wherein the determination of the body part of the player further comprises a determination of a dimension of the body part of the player.

6. The method of claim 5, wherein the dimension of the body part of the player is utilized in the determining of the real-world location of the player.

7. The method of claim 5, wherein the dimension of the body part of the player is utilized in verifying a consistency of the calibration data.

8. The method of claim 4, wherein the second reference point comprises a second feature location of the gaming environment different from the first feature location of the gaming environment.

9. The method of claim 1, wherein the camera projection is a camera projection matrix computed from a first reference point correspondence between the first reference point at a first real-world location and at a first image location, and a second reference point correspondence between the second reference point at a second real-world location and at a second image location.

10. The method of claim 9, wherein the sensor data comprises a camera intrinsic matrix of the camera.

11. The method of claim 10, wherein the sensor data further comprises an accelerometer data from the user device.

12. The method of claim 1, wherein the gaming environment is basketball, and wherein the first reference point is the player's location at a known ground location.

13. The method of claim 12, wherein the second reference point is a hoop at a known hoop location.

14. The method of claim 1, further comprising:
estimating a camera height comprising a distance between the user device and a ground level, the camera height estimated from the input video.

15. The method of claim 14, wherein a foot location of the player at the first feature location is utilized for the first reference point when the camera height exceeds a given threshold.

16. The method of claim 14, wherein a head location of the player at the first feature location is utilized for the first reference point when the camera height is below a given threshold.

17. The method of claim 14, wherein the camera height is utilized in the computing of the camera projection.

18. A non-transitory storage medium storing executable instructions, the executable instructions when executed by a hardware processor causes the hardware processor to execute a process for detecting location of at least one player in a gaming environment, the executable instructions comprising program code to:

receive calibration data from a camera of a user device, the calibration data comprising a first reference point associated with the gaming environment, a second reference point associated with the gaming environment, and sensor data associated with the user device, wherein the first reference point corresponds to a player's location at a first feature location in the gaming environment during calibration;

compute a camera projection based on the first reference point, the second reference point, and the sensor data obtained from the user device;

receive an input video of the gaming environment, wherein the input video is captured using the camera, and wherein frames of the input video comprise at least one player in the gaming environment;

identify an image location of the at east one player by performing a computer vision algorithm on the input video; and determine a real-world location of the at least one player based on the image location and the camera projection.

19. The non-transitory storage medium of claim 18, wherein the calibration data is generated by calibrating the camera by providing instructions to position the player at the first feature location in the gaming environment corresponding to the first reference point.

20. A system comprising a non-transitory storage medium storing executable instructions and a processor, the executable instructions when executed by the processor causes the processor to execute a process for detecting location of at least one player in a gaming environment, the executable instructions comprising program code to:

receive calibration data from a camera of a user device, the calibration data comprising a first reference point associated with the gaming environment, a second reference point associated with the gaming environment, and sensor data associated with the user device, wherein the first reference point corresponds to a player's location at a first feature location in the gaming environment during calibration;

compute a camera projection based on the first reference point, the second reference point, and the sensor data obtained from the user device;

receive an input video of the gaming environment, wherein the input video is captured using the camera, and wherein frames of the input video comprise at least one player in the gaming environment;

identify an image location of the at least one player by performing a computer vision algorithm on the input video; and determine a real-world location of the at least one player based on the image location and the camera projection.

* * * * *